United States Patent [19]

Shreve, Jr. et al.

[11] 3,988,587

[45] Oct. 26, 1976

[54] METHOD AND APPARATUS FOR INDICATING THE RADIOACTIVE DECAY PRODUCTS OF RADIUM IN AN ENVIRONMENT

[75] Inventors: James D. Shreve, Jr., Edmond; Larry S. Trowsdale, Oklahoma City, both of Okla.; Adare Hill, Uravan, Colo.

[73] Assignee: Kerr-McGee Nuclear Corporation, Oklahoma City, Okla.

[22] Filed: Apr. 14, 1975

[21] Appl. No.: 567,878

[52] U.S. Cl. .............................. 250/364; 250/252; 250/304; 250/336
[51] Int. Cl.² ...................... G01T 1/20; G01T 7/02
[58] Field of Search ........... 250/253, 255, 304, 336, 250/364, 380, 252

[56] References Cited
UNITED STATES PATENTS

| | | | |
|---|---|---|---|
| 2,957,084 | 10/1960 | Marr et al. | 250/304 X |
| 3,105,146 | 9/1963 | Goupil et al. | 250/364 |
| 3,555,278 | 1/1971 | Schroeder | 250/304 |
| 3,914,602 | 10/1975 | Goldstein | 250/364 X |

Primary Examiner—Archie R. Borchelt
Attorney, Agent, or Firm—William G. Addison

[57] ABSTRACT

An improved method and apparatus for providing an indication of the radiation activity of the radioactive decay products of radium in an environment wherein the alpha particle activity and the beta particle activity at a test site are detected and the detected alpha particle and the beta particle activities provide the indication of the radiation activity of radon and the decay products of radon at the test site. The background radiation activity at the test site is detected, and the detected alpha particle and the beta particle activities less the detected background radiation activity provide the indication of the radiation activity of radon and the decay products of radon. The sum of the detected alpha particle and beta particle activities provides an indication of the working level (WL); the difference between the detected alpha particle and the beta particle activities provides an indication of the radon concentration at the test site and the equivalent ingrowth time of the radon decay products (radon daughters) from the earlier existence of the radon as a gas; and the detected background radiation activity provides an indication of the penetrating radiation hazard at the test site.

40 Claims, 8 Drawing Figures

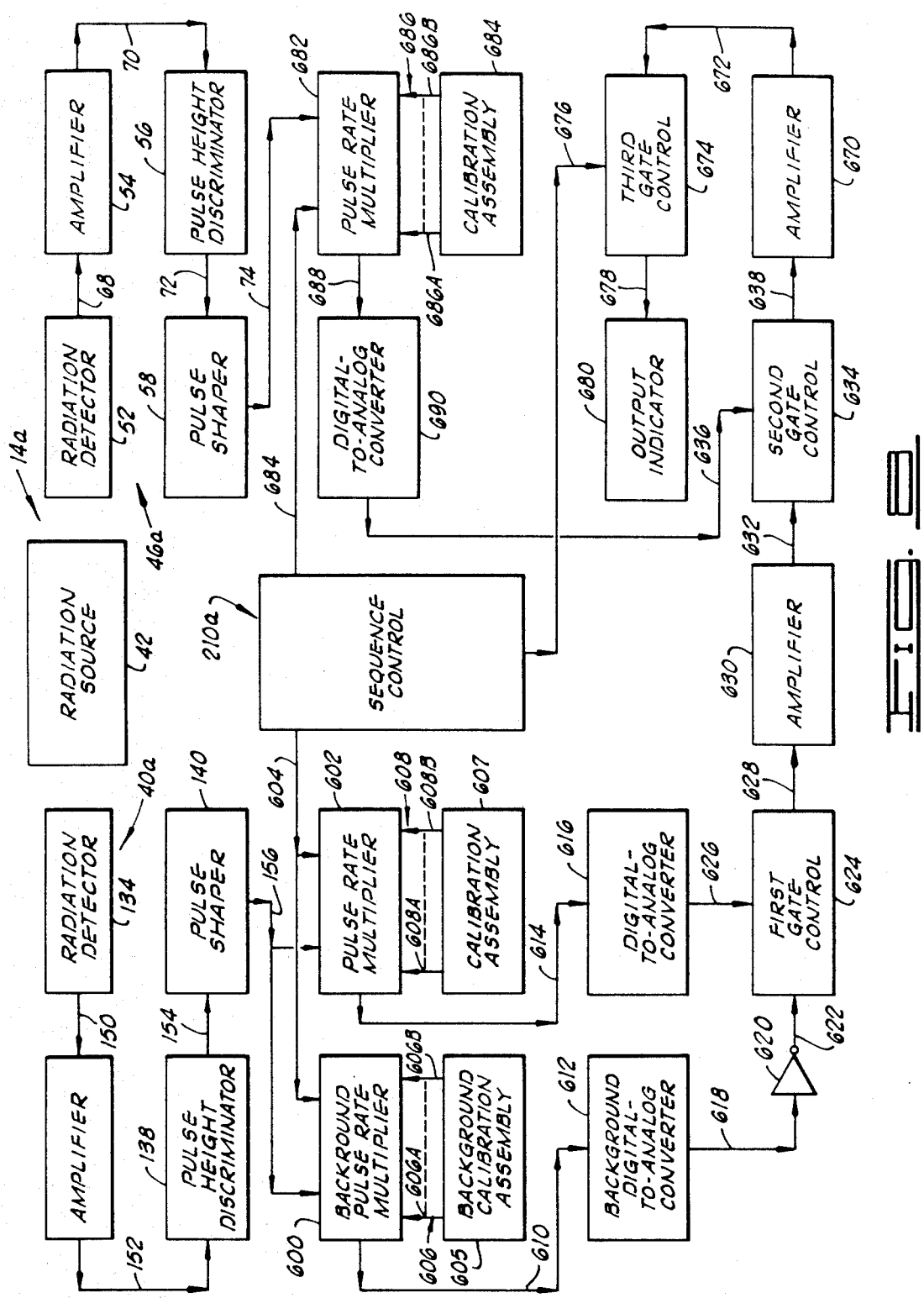

METHOD AND APPARATUS FOR INDICATING THE RADIOACTIVE DECAY PRODUCTS OF RADIUM IN AN ENVIRONMENT

BACKGROUND OF THE INVENTION

1. Field of the Invention

The present invention generally relates to a method and an apparatus for indicating the radioactive decay products of radium in an environment and, more particularly, but not by way of limitation, to a method and an apparatus for determining parameters relating to radon and the decay products of radon in an environment, such as the working level and the radon concentration, for example.

2. Brief Description of the Prior Art

In general, radioisotopes decay spontaneously and the decaying of the radioisotopes is accompanied with a radiation emission. Uranium ($^{238}$U) undergoes a series of successive radioactive transformations and each uranium decay product in the radioactive decay series is derived from the disintegration of the preceding element in the radioactive series, uranium ultimately decaying to a final or end product which is not radioactive [lead ($^{206}$Pb)]. The fifth decay product of uranium is radium ($^{226}$Ra) and radium has a relatively long half-life or half-period of approximately 1620 years (the half-life of a radioactive element being the time required for half of the initially present atoms to decay). The first decay product of radium is radon ($^{222}$Rn) and radon is the only element in the uranium decay series which is a gas at ordinary temperatures.

Since rocks and soils are porous, some of the radon diffuses out of the rock and soil surfaces into the surrounding environment on air, and the resulting airborne radiation is potentially hazardous to health. Particular airborne radon decay products (RaA, RaB, RaC and RaC') are considered to present the greatest danger to human health since a relatively substantial percentage of these inhaled airborne radon decay products are retained in the lungs. This is a particularly important consideration where the airborne radon and the airborne radon decay products are encountered in an underground mine environment.

Various parameters have been developed to measure or indicate the radioactivity due to the radon and the radon decay products with respect to the radiation exposure to the human lung and some of these parameters have been utilized for the purpose of establishing and maintaining safe working environment criteria. One such parameter has been referred to in the art generally as the "working level" (WL) and one (1) working level unit has been defined as the quantity of radon decay products (principally RaA, RaB, RaC and RaC'), in any mixture of such radon decay products, in a liter of air which produces $(1.3)(10)^5$MeV. (million electron volts) of alpha particle energy as a result of the complete decay of radon through the fourth decay product (RaC') of radon. The continuous exposure of a worker to an environment having a working level of one (1) for forth (40 hours per week over a one (1) month period of time creates a "dose" of one (1) working level month (WLM). The federal government and various state governments have enacted regulations establishing radiation activity standards and, in general, the maximum airborne radioactivity levels, expressed in terms of a working level month (WLM), have been substantially lowered over the past fifteen years, such as from maximum levels in order of 120 WLM per year to maximum levels in the order of 4 WLM per year, for example.

The radiation exposure due to external or penetrating radiation and inhalation has become an extremely important consideration with respect to the working environment of various personnel and particularly with respect to the personnel working in radioactive material underground mines. In an effort to protect such personnel from an excessive, harmful exposure to radiation, the quality and stability of mine ventilation techniques have been improved over the last few years. To maintain the desired quality and stability of the mine ventilation techniques, it generally is necessary to maintain and establish programs and procedures for monitoring the mine ventilation equipment and the environment or air in the mine passageways.

Various analytical procedures and various types of equipment have been developed for detecting the radiation activity of air environment in the mine passageways. However, various problems have been encountered in attempting to develop a useful, effective and efficient technique and apparatus for detecting and measuring the required environmental parameters for determining the radiation activity in a mine environment. For example, distortion has presented a problem in detecting and measuring the required parameters, gamma ray background radiation has presented a problem, the equipment costs have been relatively high and sophisticated computation generally was required to analyze the various detected parameters for the purpose of obtaining the desired radiation activity parameter, such as the working level or the like, for example. Further, most of the prior techniques utilized for monitoring radon decay product (radon daughter) activity in mine environments have been relatively slow (35 to 90 minutes, for example), and the time delay generally encountered between the sampling of the mine air environment at particular test sites or locations and the determination of the desired parameter has been approximately two (2) hours, for example. Unfortunately, the time delay generally encountered in utilizing current techniques for detecting radon decay product activity greatly affects the ability to efficiently and economically maintain and control the quality of the mine air environment or, in other words, if the radon decay product activity could be evaluated in a relatively short time at the test site, remedial steps could be immediately effectuated to correct the condition causing any detected radon decay product activity near or in excess of a maximum level for safe working conditions. In addition, the mine air environment could be immediately re-sampled after such corrective measures have been completed for the purpose of evaluating the effectiveness of such corrective measures, thereby substantially reducing the possibility of a mine shut-down by the discovery and remedy of radiation conditions before such conditions result in an unsafe exposure to the mine air environment.

Some of the various fundamental physical principles relating to the behavior of radon daughters (decay products) were discussed in an article entitled "Engineers' Guide to the Elementary Behavior of Radon Daughters" by Robley D. Evans, Health Physics, Pergamon Press, 1969, Vol. 17, pp. 229–252. One prior art technique was discussed in an article entitled "Modification of the Tsivoglou Method for Radon Daughters in Air" by Jess W. Thomas, Health Physics, Pergamon Press, 1970, Vol. 19 (Nov.), p. 691.

SUMMARY OF THE INVENTION

The present invention contemplates an improved method and apparatus for indicating the radiation activity of the radioactive decay products of radium in an environment and, more particularly, for indicating the radiation activity of radon and the decay products of radon in an air environment at test sites or test locations. The alpha particle and the beta particle activities at the test site are detected, and output indications are provided in response to the detected alpha particle and beta particle activities. The sum of the detected alpha particle and the beta particle activities provides an output indication of the radiation activity of the radon decay products at the test site, the sum of the alpha and the beta particle activities being indicative of the working level (WL) at the test site. The difference between the detected alpha particle activity and the detected beta particle activity provides an indication of the radon concentration at the test site, and the detected radiation parameters of the present invention also provide an indication of the ingrowth time of radon decay products from the earlier existence of the radon as a gas at the test site.

In addition to the foregoing, the method and the apparatus of the present invention contemplate the detecting of the background radiation activity at the test site and the detected background radiation is subtracted from the sum of and the difference between the detected alpha particle and the beta particle activities, the resulting indications providing the radiation activity parameters contemplated via the present invention. The method and the apparatus of the present invention provide the radiation activity parameters within a few minutes and thus the desired radiation activity parameters are available at the test site location in an efficient manner and within a relatively short time such that the radiation activity parameters are immediately available for use in effecting remedial or corrective actions when the detected radiation activity is near the maximum established permissible radiation activity levels thereby substantially reducing the necessity of complete or partial shut-downs for the purpose of effecting corrective actions and allowing a virtually immediate reevaluation of the radiation activity at the test site for the purpose of checking or verifying the effectiveness of the corrective actions and for the purposes of checking or verifying prior determined radiation activity parameters.

BRIEF DESCRIPTION OF THE DRAWINGS

FIG. 8 is a diagrammatic, schematic view, similar to FIG. 3, but showing a modified radiation activity indicator.

DESCRIPTION OF THE PREFERRED EMBODIMENTS

Figure 1:
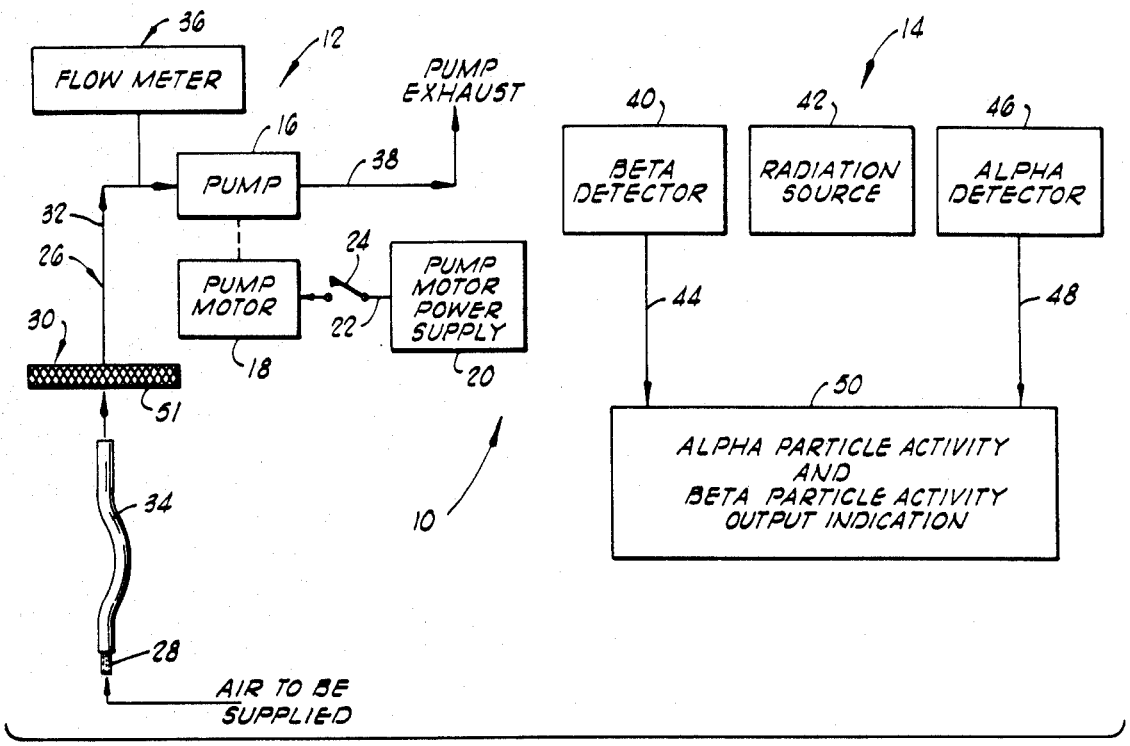
FIG. 1 is a diagrammatic, schematic view showing the apparatus of the present invention and illustrating aspects of the method of the present invention.

Referring to the drawings in general and to FIG. 1 in particular, shown therein and designated via the general reference numeral 10 is an apparatus for indicating various parameters relating to the radioactive decay products of radium in accordance with the present invention. In general, the apparatus 10 includes a sample collector 12 and a radiation activity indicator 14.

The sample collector 12 includes: a pump 16, having a "driven" condition, constructed to pump air or the like therethrough at a predetermined, known volumetric flow rate in the driven condition thereof; a pump motor 18, having an "on" condition and an "off" condition, mechanically connected to the pump 16 for driving the pump 16 in the on condition of the pump motor 18; a pump motor power supply 20 connected to the pump motor 18 via a signal path 22; a switch 4 interposed in the signal path 22 between the pump motor 18 and the pump motor power supply 20 for switching the pump motor 18 from the off to the on condition in the closed position of the switch 24 establishing electrical continuity between the pump motor 18 and the pump motor power supply 20 and for switching the pump motor 18 from the on condition to the off condition in the opened position of the switch 24, interrupting electrical continuity between the pump motor 18 and the pump motor power supply 20; an inlet conduit 26, having one end connected to the suction side of the pump 16; an inlet nozzle 28 connected to the end of the inlet conduit 26, opposite the end of the inlet conduit 26 connected to the pump 16; a sample filter 30 interposed in the inlet conduit 26, generally between the suction side of the pump 16 and the inlet nozzle 28, and constructed of a material suitable for filtering radioactive particles (particularly, alpha particles and beta particles emitted via the radioactive decay products of radium) from an air stream or the like flowing therethrough. In one preferred embodiment, the inlet conduit 26, more particularly, includes a first inlet conduit secton 32 and a second inlet conduit section 34. The second inlet conduit section 34 is constructed of a flexible tubing type of material or the like to facilitate the disposition of the inlet nozzle 28 at remote test sites, such as a test site located within a hole or other such remote test site, for example, the inlet nozzle 28 being connected to the end of the second inlet conduit section 34, opposite the end of the second inlet conduit secton 34, opposite the end of the second inlet conduit section 34 connected to the first inlet conduit section 32. The sample collector 12 also includes a flow meter 36 having a portion interposed in the inlet conduit 26, generally between the sample filter 30 and the suction side of the pump 16. The flow meter 36 senses the air stream flowing through the inlet conduit 26 and provides an output indication of the volumetric flow of the air stream through the inlet conduit 26 and through the pump 16 via a meter needle or a digital display or an electrical signal or the like, for example. The air stream is discharged via the outlet end of the pump 16 into a discharge 38 and discharged to a pump exhaust, as indicated in FIG. 1, the air stream being discharged to a pump exhaust such as atmosphere or an accumulator or the like, for example.

The radiation activity indicator 14 includes: a beta detector 40, having an off condition and an on condition, for detecting beta particle activity emitted from a radiation source 42 and providing an output indication 44 in response to an indicative of the detected beta particle activity in the on condition of the beta detector 40, the output indication being an electrical signal in one form, for example; an alpha detector 46, having an on condition and an off condition, for detecting alpha particle activity emitted from the radiation source 42 and providing an output indication 46 in response to and indicative of the detected alpha particle activity in the on condition of the alpha detector 46, the output indication being an electrical signal in one form, for example; and an output indicator 50 which receives the beta detector 40 output indication 44 and the alpha detector 46 output indication 48 and provides an output indication in response to the received output indications 44 and 48. The radiation source 42 may take any form, such as a gas or a solid or a gas-solid mixture, for example, the particular form identification of the radiation source 42 depending upon a particular operational application of the method and the apparatus of the present invention, as will be described in greater detail below.

The method and the apparatus of the present invention are each particularly adapted to provide output indications of various parameters relating to the radioactive decay products of radium in an environment, such as an underground mine atmosphere, for example. More particularly, the method and the apparatus of the present invention provide output indications of various parameters relating to the radioactive decay products of radon (radon being one of the radioactive decay products of radium), such as the working level, radon concentration and the equivalent ingrowth time of the decay products of radon from the prior existence of radon as an essentially pure gas, for example.

Radium ($^{226}$Ra) is one of the radioactive decay products of uranium ($^{238}$U). The relatively long half-life or half-period of radium and the radioactive emissions of radium's decay products have been factors in making radium an important commercial radionuclide. In a manner similar to other radio-nuclides, the atomic nuclei of radium spontaneously disintegrates transmuting the original radium element into radon which also disintegrates. In time, subsequent, progressive disintegrations eventually lead every radium atom to the formation of a stable, non-radioactive element. The disintegration of radium through the sequence of successive radium decay products is accompanied by the emission of alpha particles, beta particles and gamma rays, for example.

The first decay product of radium is radon ($^{222}$Rn) and radon principally emits alpha particle radiation. Radon exists as a gas at ordinary temperatures and thus radon diffuses through and is carried through various environments, radon being effused from exposed rock and soil surfaces and being carried through the surrounding air. The airborne radon continues to decay producing the radioactive decay products of radon accompanied by the corresponding radiation emission, the radioactive decay products of radon being generally referred to in the art as "radon daughters." The principal sequence of the decay products of radium and radon are summarized in TABLE I, below, wherein the name and the symbol of each element is followed by the principal type of radiation emission and the half-life of each element (the half-life of each element being shown in parentheses in TABLE I).

TABLE I

| Radium | Ra | Alpha (1620 years) |
|---|---|---|
| Radon | Rn | Alpha (3.82 days) |
| Radium A | RaA | Alpha (3.05 minutes) |
| Radium B | RaB | Beta-Gamma (26.8 minutes) |
| Radium C | RaC | Beta-Gamma (19.7 minutes) |
| Radium C' | RaC' | Alpha (0.00016 seconds) |
| Radium D | RaD | Beta (22 years) |
| Radium E | RaE | Beta (5.0 days) |
| Radium F | RaF | Alpha (138 days) |

The isotopic name and the isotopic symbol of radium and radon and each of the decay products of radon are as follows: radium [radium ($^{226}$Ra)]; radon [radon ($^{222}$Rn)]; radium A [polonium ($^{218}$Po)]; radium B [lead ($^{214}$Pb)]; radium C [bismuth ($^{214}$Bi)]; radium C' [polonium ($^{214}$Po); radium D [lead ($^{210}$Pb)]; radium E [bismuth ($^{210}$Bi)]; and radium F [polonium ($^{210}$Po)]. A small percentage (0.04%) of radium C emits an alpha particle type of radiation and this has been omitted from TABLE I above principally because of the small percentage.

One parameter utilized for evaluating the radiation hazard to personnel in particular work environments is commonly referred to in the art as "working level" (WL) and one (1) working level unit is defined as that quantity of airborne radon decay products, in any mixture, in one (1) liter of air which products (1.3) (10)$^5$MeV. of alpha particle energy as a result of the complete decay of radon through the fourth decay product (RaC') of radon. The continuous exposure of a worker to an environment having a working level of one (1) for forty (40) hours per week over a one (1) month period of time creates a "dose" of one (1) working level month (WLM). In general terms, the working level parameter represents the airborne radiation exposure of the human lung resulting primarily from the radon decay products filtered from the inhaled air via the human lung, i.e. a parameter representing the inhalation radiation hazard to humans as compared to the penetration radiation hazard to humans resulting principally from penetrating radiation such as gamma ray type of radiation.

The working level parameter is primarily concerned with the alpha particle radiation emission (the alpha particle activity) at a particular test site or test location due to the radiation decay products of radium. The radiation activity of radon generally is not considered as a factor in determining the working level parameter and the inhalation radiation hazard indicated via the working level parameter is primarily due to the short-lived radon decay products, i.e. radium A (RaA), radium B (RaB), radium C (RaC), and radium C' (RaC'). As noted in TABLE I above, radium B (RaB) and radium C (RaC) each emit beta particle and gamma ray types of radiation; however, radium B (RaB) and radium C (RaC) decay into radium C'(RaC') within a relatively short period of time and radium C' (RaC') produces an alpha particle radiation energy having a magnitude of approximately (7.68) MeV. Each atom of radium A (RaA) produces an alpha particle radiation energy having a magnitude of approximately (6.00) MeV.; however, each atom of radium A (RaA) has a potential alpha particle radiation energy of approximately [6.00 + 7.68 = 13.68] MeV. produced as radium A (RaA) decays through radium B (RaB) and radium C (RaC) and radium C' (RaC'). Radium D (RaD) and radium E (RaE) emit beta particle radiation, and the decay product of radium E (RaE), i.e. radium F (RaF), emits alpha particle radiation. Radium F (RaF) is not considered in determining the working level parameter since it has been considered unlikely for enough atoms of radium F (RaF) to be retained in the human lung and since the potential inhalation radiation hazard to humans from radium F (RaF) is relatively insignificant as compared with radium A (RaA) and radium C' (RaC'). In summary, the working level parameter is primarily affected via the alpha particle activity resulting from the radon decay products (radon daughters), radium A (RaA) and radium C' (RaC').

With respect to the natural radon family of elements (radon decay products), it has been found that the sum of the alpha particle activity and the beta particle activity found on air samples of different age or different mixtures of radon decay products (radon daughters) remains relatively stable for a given working level, i.e. the sum of the alpha particle activity and the beta particle activity of the radon decay products filtered from the air at a test site changes in a relatively slow manner for a given working level parameter. Conversely, the sum of the alpha particle activity and the beta particle activity of the radon decay products filtered from the air at a test site varies as a substantially constant function of the working level parameter. Based on this concept and with the proper selection of air sampling intervals, the sampling rate, radiation activity decay times after the termination of the air sampling step and the selection of the counting periods of time, the working level parameter of air at a particular test site is determined from the sum of the alpha particle activity and the beta particle activity, the method and the apparatus of the present invention also being useful for determining various other parameters relating to radioactive decay products of radon in a manner to be described in greater detail below.

In general, the apparatus 10 is transported to a particular test site, such as a particular location in an underground mine passageway, for example, and the sample filter 30 is disposed in the inlet conduit 26 of the sample collector 12. The flexible second inlet conduit section 34 is maneuvered to position the inlet nozzle 28 within the air environment at the selected test site. After the inlet nozzle 28 has been properly positioned, the switch 24 is closed establishing electrical continuity between the pump motor power supply 20 and the pump motor 18 thereby conditioning the pump motor in the on condition for driving the pump 16. In the driven condition of the pump 16, air is pumped from the air environment at the selected test site, through the inlet nozzle 28, through the inlet conduit 26 to the suction side of the pump 16, and through the pump 16 into the discharge conduit 38, the air being discharged to a pump exhaust as indicated in FIG. 1. It should be noted that the sample filter 30 can be disposed in a portion of the inlet nozzle 28 or in any other position within the sample collector 12 wherein the air being sampled passes through the sample filter 30.

The air is pumped by the pump 16 through the sample collector 12 at a predetermined volumetric flow rate for a predetermined period of time (sometimes referred to herein as the "sample period of time"), and the air pumped through the sample collector 12 passes through the sample filter 30. After the laspe or termination of the sample period of time, the switch 24 is opened interrupting electrical continuity between the pump motor power supply 20 and the pump motor 18, thereby conditioning the pump motor 18 and the pump 16 each in the off condition. Thus, a predetermined, known volume of air from the test site is passed through the sample filter 30 during the sample period of time, the filter 30 filteringly collecting particles containing radon daughters which emit alpha particle radiation and beta particle radiation and some gamma radiation.

The sample filter 30 contaminated with the filtered radiative daughters is removed from the inlet conduit 26 of the sample collector 12 and transferred to the radiation activity indicator 14, the time allowed to transfer the sample filter 30 from the sample collector 12 to the radiation activity indicator 14 being a known, predetermined period of time, sometimes referred to herein as the "transfer period of time." The sample filter 30 is disposed in a predetermined position with respect to the beta detector 40 and the alpha detector 46, and the sample filter 30 provides the radiation source 42 during this aspect of the operation of the radiation activity indicator 14.

After the sample filter 30 has been positioned in the radiation activity indicator 14, the beta and the alpha detectors 40 and 46 are each conditioned in the on condition for a known, predetermined period of time, the predetermined period of time during which the alpha and the beta detectors 40 and 46 are conditioned in the one condition being sometimes referred to herein as the "radiation count period of time." During the radiation count period of time when the alpha and the beta detectors 40 and 46 are each in the on condition, the beta detector 40 detects the beta particle activity from the radiation source 42 (the sample filter 30) and provides the output indication 44 representing the detected beta particle activity, the alpha detector 46 detecting the alpha particle activity from the radiation source 42 (the sample filter 30) and providing the output indication 48 representing the detected alpha particle activity.

The output indicator 50 receives the beta detector 40 output indication 44 and the alpha detector 46 output indication 48. After the lapse or termination of the radiation count period of time, the output indicator 50 provides the output indication of the radiation activity of radon and the decay products of radon at the test site as detected from the radiation source 42 (the sample filter 30).

In one preferred embodiment, the beta detector 40 and the alpha detector 46 each comprise a photomultiplier tube and a scintillator material. The scintillator material of the beta detector 40 is sensitive to and detects beta particle activity, the scintillator material of the beta detector 40 emitting short flashes of light (photons) in response to beta particles from the radiation source 42 passing therethrough. The scintillator material of the alpha detector 46 is sensitive to and detects alpha particle activity, the scintillator material of the alpha detector 46 emitting short flashes of light (photons) in response to alpha particles from the radiation source 42 passing therethrough. The photomultiplier tube of the beta detectors 40 receives the flashes of light emitted via the scintillator material and provides an electrical signal output indication 44 in response to the received flashes of light, the electrical signal output indication 44 being in the form of an electrical signal pulse in response to each received flash of light. By the same token, the photomultiplier tube of the alpha detector 46 receives the flashes of light emitted via the scintillator material and provides an electrical signal output indication 48 in response to the received flashes of light, the electrical signal output indication 48 being in the form of an electrical signal pulse in response to each received flash of light. Thus, the number of output signal pulses provided via the photomultiplier tubes of the beta and alpha detectors 40 and 46 each represent a count of the number of flashes of light and, since the number of flashes of light emitted via the scintillator material represents the number of alpha or beta particles (depending upon the particular type of scintillator material utilized) passing through the scintillator material, the output signal pulses provided via each photomultiplier tube represent the number of detected alpha or beta particles, the beta detector 40 utilizing a photomultiplier tube in conjunction with a scintillator material responsive to beta particles and providing output signal pulses representing the number of detected beta particles, and the alpha detector 46 utilizing a photomultiplier tube in conjunction with a scintillator material reponsive to alpha particles and providing the output signal pulses representing the number of detected alpha particles.

The output signal pulses produced via the photomultiplier tube in the beta detector 40 comprise the output indication 44, in one form, and the output signal pulses produced via the photomultiplier tube in the beta detector 40 are utilized to produce the output indication 44, in one other form. In any event, the output indication 44 represents a chosen fraction of the total number of beta particles emitted from the radiation source 42 (the sample filter 30) during the radiation count period of time.

By the same token, the output signal pulses produced via the photomultiplier tube in the alpha detector 46 comprise the output indication 48, in one form, and the output signal pulses produced via the photomultiplier tube in the alpha detector 46 are utilized to produce the output indication 48, in one other form. In any event, the output indication represents a chosen fraction of the total number of alpha particles emitted from the radiation source 42 (the sample filter 30) during the radiation count period of time.

Most of the scintillator materials utilized to detect beta particle activity are also responsive to gamma rays and, in this event, the total number of output signal pulses produced via the beta detector 40 also includes a portion representing the gamma ray activity. Thus, when no radiation activity indicator 14 is conditioned in the on condition (sometimes referred to herein as the "counting mode"), the beta detector 40 produces an output indication representing the gamma ray activity and, since gamma ray radiation sources may exist in the environment at the test site, the beta detector 40 produces output signal pulses representing the detected gamma ray activity in addition to the output signal pulses representing the detected beta particle activity. It is significant to note that the external gamma ray radiation emitted from the environment at the test site is detected via the beta detector 40 when the beta detector 40 is conditioned in the counting mode and this external gamma ray radiation is sometimes referred to herein as "background radiation." Thus, the output indication 44 of the beta detector 40 includes a portion representing the detected background radiation produced as a result of the external gamma ray radiation and the sum of the detected alpha particle and beta particle activities should be reduced via an amount representing the detected background radiation to provide a more accurate representation or output indication of the working level parameter and the various other parameters contemplated via the present invention.

In one aspect, the radiation activity indicator 14 is positioned within the air environment generally near the test site and the beta detector 40 is conditioned in the on condition (the counting mode) for a predetermined period of time (sometimes referred to herein as "background count period of time") prior to the disposition of the sample filter 30 in the radiation activity indicator 14. In this condition, the beta detector 40 detects the background radiation primarily due to the gamma ray radiation from the environment at the test site and provides the output indication 44 representing the detected background radiation. After obtaining the output indication 44 representing the detected background radiation, the sample filter 30 is inserted in the radiation activity indicator 14 generally near the beta and the alpha detectors 40 and 46, and the sum of the detected alpha particle and beta particle activities is obtained in a manner generally described before, the detected background radiation being subtracted from the sum of the detected alpha particle and beta particle activities to provide the output indicator 50 output indication representing the working level parameter and the other parameters contemplated via the present invention.

In addition to the background radiation, it is possible for the radiation activity indicator 14 to become contaminated with radioactive materials from time-to-time during the utilization of the radiation activity indicator 14 and the contamination radiation may consist of alpha particles, beta particles and gamma rays or one or more of such types of radiation emission. Thus, during the radiation count period of time, such contamination radiation will be detected via either the beta detector 40 or the alpha detector 46 or both depending upon the particular type of radiation emission associated with the contamination radiation. In any event, the contamination radiation will affect the output indications 44 and 48, and the sum of the detected alpha particle and beta particle activities should be reduced by an amount representing the detected contamination radiation to provide a more accurate representation or output indication of the working level parameter and the other parameters contemplated via the present invention.

Thus, in one aspect, the alpha and the beta detectors 40 and 46 are each conditioned in the on condition (the counting mode) for a predetermined period of time prior to the disposition of the sample filter 30 in the radiation activity indicator 14, the predetermined period of time also being sometimes referred to herein as the "background count period of time." In this mode of operation, the background radiation and the contamination radiation are detected and an output indication is provided via the output indicator 50 representing the background and contamination radiation detected during the background count period of time, and the detected background and contamination radiation is subtracted from the sum of the detected alpha particle and beta particle activities to provide the output indication representing the working level parameter and the other parameters contemplated via the present invention.

Figure 2:
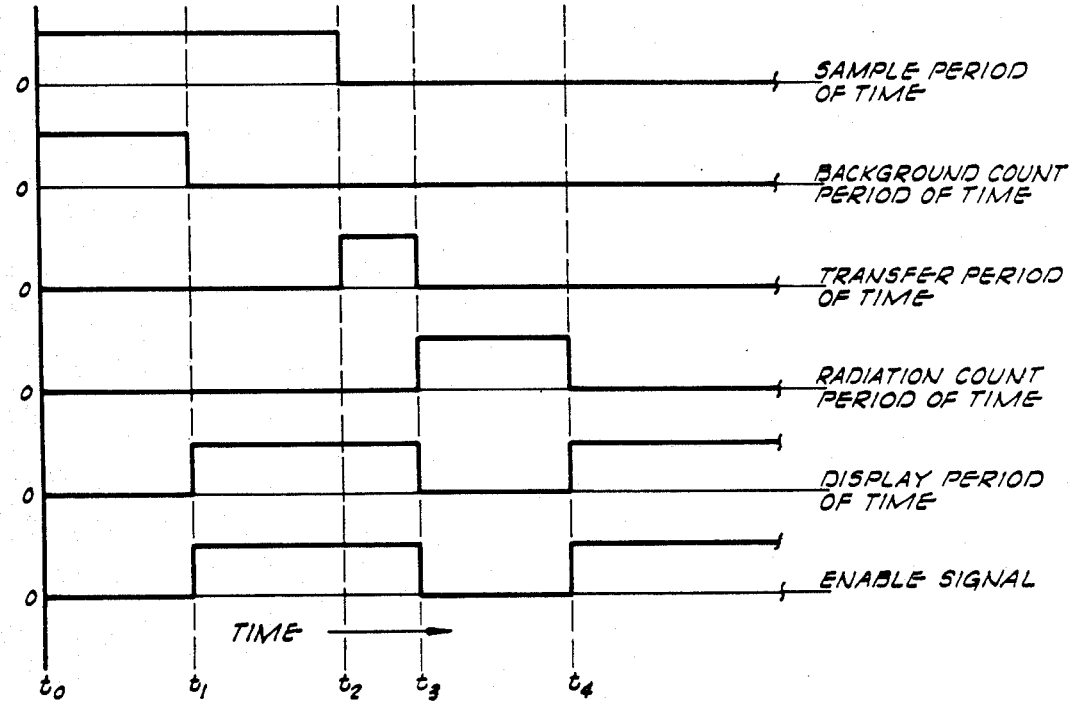
FIG. 2 is a diagrammatic, schematic view of a timing diagram showing one embodiment of the timing sequence of the method and the apparatus of the present invention.

One preferred timing sequence illustrating the operation of the method and the apparatus of the present invention is shown in FIG. 2 of the drawings wherein the background count period of time extends from time ($t_0$) to time ($t_1$); the sample period of time extends from time ($t_0$) to time ($t_2$); the transfer period of time extends from time ($t_2$) to time ($t_3$) and the radiation count period of time extends from time ($t_3$) to time ($t_4$). In one operational embodiment of the invention, the background count period of time from time ($t_0$) to a time ($t_1$) is substantially equal to sixty (60) seconds; the sample period of time from a time ($t_0$) to a time ($t_2$) is substantially equal to one hundred twenty (120) seconds; the transfer period of time from a time ($t_2$) to a time ($t_3$) is substantially equal to thirty (30) seconds; and the radiation count period of time from a time ($t_3$) to a time ($t_4$) is substantially equal to sixty (60) seconds. In this particular operational embodiment, the background radiation and the contamination radiation detected via the beta and the alpha detectors 40 and 46 is available for display via the output indicator 50 for a first display period of time from a time ($t_1$) to a time ($t_3$) substantially equal to ninety (90) seconds following the termination of the background count period of time. The alpha particle count with background subtracted and the beta ray count with background subtracted are presented for a second display period of time from a time ($t_4$) until the radiation activity indicator 14 is conditioned in the off condition following the termination of the radiation count period of time. Also shown in FIG. 2, is a timing diagram of the signal for activating or enabling the beta detector 40 and the alpha detector 46 (designated in FIG. 2 as the "Enable Signal" and, in this particular operational embodiment, the enable signal is in the "high" state for a period of time from a time ($t_0$) to a time ($t_1$) and for a period of time from a time ($t_3$) to a time ($t_4$), and beta detector 40 and the alpha detector 46 being conditioned in the on condition or the counting mode in the high state of the enable signal and the enable signal being in the high state during the background count period of time and the radiation count period of time. It should be noted that the background count period of time occurs simultaneously with the sample period of time since the two operations can be conducted in an independent manner with the sample collector 12 being utilized for collecting the radiation sample and the radiation activity indicator 14 being utilized for determining the background radiation activity.

In one preferred operational embodiment, the radiation activity indicator 14 is calibrated to substantially assure an accurate output indication of the detected beta particle and alpha particle activities. With respect to the calibration of the beta particle activity detection and indication portion of the radiation activity indicator 14, a pure beta particle emitting radioactive material is disposed in the radiation activity indicator 14 and positioned near the beta detector 40, the pure beta particle emitting radioactive material constituting the radiation source 42 during the calibration aspect of the operation of the present invention. The pure beta particle emitting source has a predetermined size, shape and known beta particle radiation emission and the radiation activity indicator 14 is adjustingly calibrated to a calibrated condition wherein the output indication of the detected beta particle activity provided via the output indicator 50 corresponds to the known output indication which should be provided in response to a radiation source 42 comprising the pure beta particle emitting radioactive material.

The alpha particle activity detection and indication portion of the radiation activity indicator 14 is calibrated in a manner similar to that described above with respect to the calibration of the beta particle activity portion. A pure alpha particle emitting radioactive material is disposed in the radiation activity indicator 14 and positioned near the alpha detector 46, the alpha particle emitting radioactive material constituting the radiation source 42 during the calibration aspect of the present invention. The pure alpha particle emitting source has a predetermined size, shape and known alpha particle radiation emission and the radiation activity indicator 14 is adjustingly calibrated to a calibrated condition wherein the output indication of the detected alpha particle activity provided via the output indicator 50 corresponds to the known output indication which should be provided in response to a radiation source 42 comprising the pure alpha particle emitting radioactive material.

The beta detector 40 and the alpha detector 46 each provide an output signal indicating or representing the detected beta particle and alpha particle activities, as mentioned before. The beta particle and the alpha particle activities are each expressed in terms of disintegrations per minute (dpm); however, the beta detector 40 and the alpha detector 46 output signals representing the detected beta particle and alpha particle activities are each expressed in terms of counts per minute (cpm). The beta detector 40 and the alpha detector 46 output signals expressed in terms of counts per minute (cpm) are related to the actual beta particle and the alpha particle activities (dpm) by a factor (F) to correct (cpm) to $4\pi$ counting geometry (dpm), i.e. [dpm = (F) (cpm)]. The beta detector 40 and the alpha detector 46 each include a calibration assembly for adjustingly calibrating the beta and the alpha detectors 40 and 46 to provide output signals representing the beta particle and the alpha particle activities as a predetermined fraction of activities in terms of disintegrations per minute (dpm).

Once the beta detector 40 and the alpha detector 46 have been calibrated to provide output signals representing the beta particle and the alpha particle activities in the same known relation to terms of disintegrations per minute (dpm), the sum of the alpha particle and the beta particle activities is proportional to the working level (WL). The precise relationship between the sum of the alpha particle and the beta particle activities and the working level (WL) depends also on the volumetric flow rate of the air through the sample collector 12 or, more particularly, through the sample filter 30; the time elapsed between the termination of the sample period of time at a time ($t_2$) and the beginning of the radiation count period of time at a time ($t_3$), i.e. a total time equal to the transfer period of time; the periods of time allowed for the background count period of time and the radiation count period of time; and the sample period of time. One particularized timing sequence in accordance with the present invention is shown in FIG. 2, and, in one operational embodiment, the volumetric flow rate of the air passing through the sample filter 30 is approximately equal to (2.5) liters per minute. In one operational embodiment, for example, the radiation activity indicator 14 is calibrated to provide an output indication of the sum of the alpha particle and the beta particle activities divided by one thousand (1000), the output indication being the desired working level parameter.

The age of the air being sampled should be considered in the calibration of the radiation activity indicator 14 since this factor can result in errors in the working level parameter determination, the "age" of air refers to the elapsed time since the radon decay products were last removed from the radon in the air environment being tested [for example, "6-minute air" refers to air which has had six (6) minutes to accumulate radon decay products]. In calibrating one operational radiation activity indicator 14, the working level parameter was multiplied by a factor of (1.3) for 6-minute air; the working level parameter was multiplied by a factor of (1.12) for "20-minute air", the working level parameter was multiplied by a factor of (0.93) for "45-minute air" to equilibrium.

Since the present invention provides the working level parameter within a relatively short period of time, the air environment can be sampled a second time to provide second determined parameters for checking the first determined parameters or re-evaluating the air environment to check the effectiveness of procedures initiated to correct a detected unsafe condition. Further, a second working level parameter can be determined utilizing the same sample filter 30 which was utilized to provide the first determined working level parameter. To obtain the second determined working level parameter, the sample filter 30 is removed from the radiation activity indicator 14 and the radiation activity indicator 14 is reset to start the operation thereof at the time ($t_0$). A second background radiation, including a second contamination radiation, is detected during the background count period of time and, at the time ($t_2$), the same sample filter 30 is disposed in the radiation activity indicator 14, the alpha particle and the beta particle activities being determined during the radiation count period of time in a manner described before. In determining the second working level parameter, the sample filter 30 is removed from the radiation activity indicator 14 for a period of time approximately equal to one (1) minute and a factor of (1.4) is applied to the sum of the second detected alpha particle and beta particle activities to obtain the second determined working level parameter, the factor of (1.4) being multiplied by the sum of the second detected alpha particle and beta particle activities to compensate for the time delay incurred in performing the second sampling procedure. It has been found that the second determined working level parameter provides a more precise working level measurement as compared to the first determined working level parameter.

Figure 7:
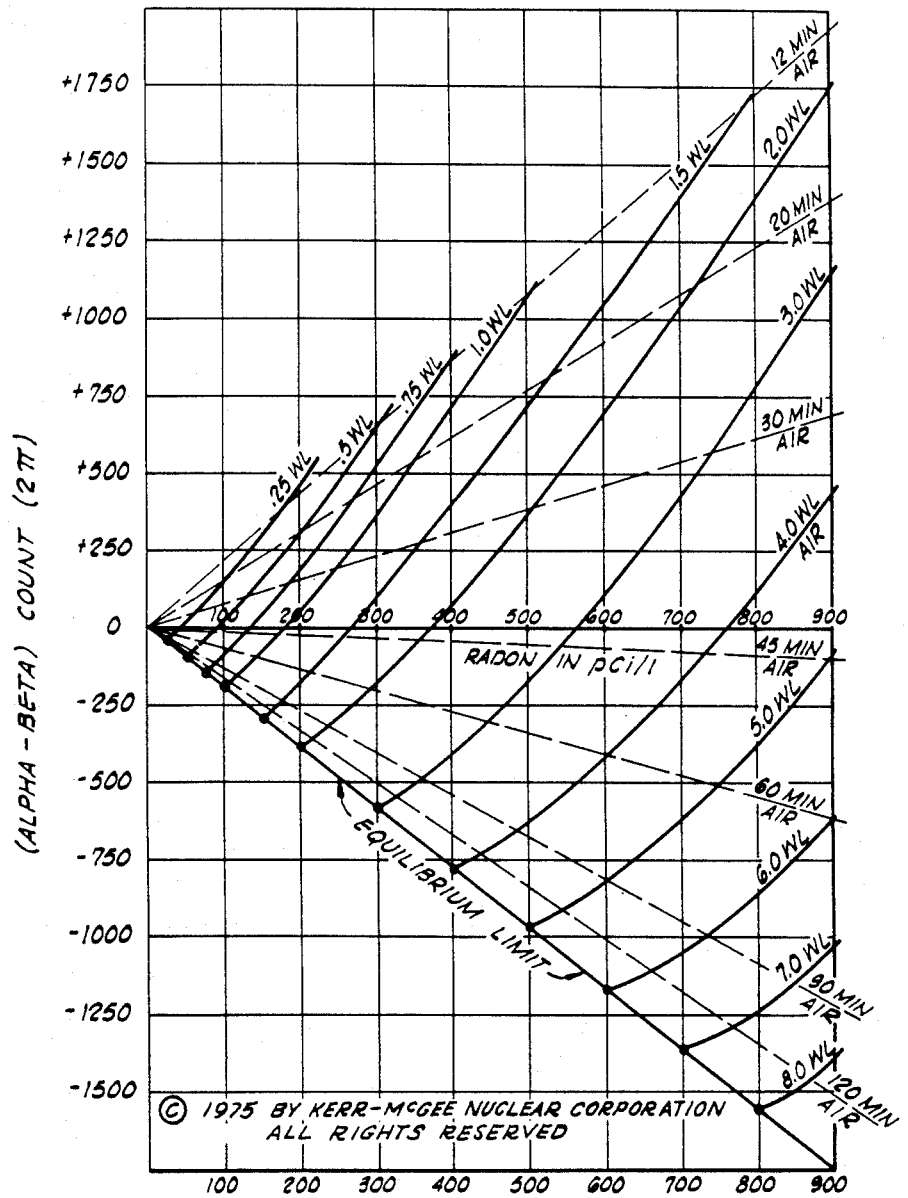
FIG. 7 is a chart plotting the relationship of the differences between the alpha and the beta particle activities, the radioactivity of radon expressed in picocuries (pCi) per liter, and the working level for graphically illustrating some aspects of the present invention (the chart of FIG. 7 being copyrighted by Kerr-McGee Nuclear Corporation).

In addition to the other parameters, the present invention also contemplates the determination of the radon concentration expressed in picocuries per liter (pCi/l). In this aspect of the invention, the beta particle activity is subtracted from the alpha particle activity to obtain the difference between the detected alpha particle and the beta particle activities and, utilizing this difference together with the working level parameter determined via summing the detected alpha particle and beta particle activities, the radon concentration is estimated from the chart shown in FIG. 7. In addition to the radon concentration, the age of the air being sampled (the equivalent radon daughter ingrowth time) also is estimated from the chart shown in FIG. 7. For example, assuming a detected alpha particle activity of (880) and a detected beta particle activity of (620) [the alpha particle and the beta particle activities each representing the amounts determined during the radiation count period of time with the background the contamination radiation as determined during the background count period of time, subtracted therefrom], the working level parameter is equal to 1/1000 the sum of the detected alpha particle and the beta particle activities, i.e. (1.50) WL, and the difference between the detected alpha particle and beta particle activities is equal to (+260). Based on these parameters, the radon concentration is estimated from the chart of FIG. 7 to be [350 pCi/l] and the age of the air being sampled is estimated from the chart of FIG. 7 to be about 30 minutes. The chart of FIG. 7 is based on a sample period of time approximately equal to two (2) minutes, a volumetric flow rate through the sample collector 12 of approximately (2.5) liters per minute, and a one (1) minute decay time. It should be noted that the chart of FIG. 7 is not applicable to radon daughter ingrowth times equal to or less than six (6) minutes.

It should be noted that alpha particle radiation is not a type of penetrating radiation; however, beta particle radiation is a penetrating type of radiation. This is an important consideration in determining the disposition and the orientation of the sample filter 30 in the sample collector 12 and in the radiation activity indicator 14. As diagrammatically shown in FIG. 1, the sample filter 30 is oriented in the sample collector 12 such that the filterable airborne radioactive particulate matter is deposited on a particle collection side 51 of the sample filter 30. When the sample filter 30 is disposed in the radiation activity indicator 14, the sample filter 30 preferably oriented such that the particle collection side 51 of the sample filter 30 is disposed near the alpha detector 48 and the side of the sample filter 30, opposite the particle collection side 51, is disposed near the beta detector 40. The orientation of the sample filter 30 in the radiation activity indicator 14 in a manner just described tends to improve the detection efficiency of the radiation activity indicator 14, since the beat particle radiation will penetrate the thickness of the sample filter 30 for detection via the beta detector 40, while the alpha particle radiation will be detected via the alpha detector 46 without the necessity of penetrating the sample filter 30 material thickness. In one embodiment, the sample filter 30 is supported in a sample holder and the radiation activity indicator 14 is constructed to receive the sample holder in a manner substantially assuring the disposition of the particle collection side 51 of the sample filter 30 near the alpha detector 46 in a manner to be described below in connection with FIG. 8.

In one embodiment of the invention, the scintillator utilized in the beta detector 40 may be constructed of a material having a thickness of (0.020 inches) and commercially available from such sources as New England Nuclear, one scintillator material being identified via the New England Nuclear designation "Pilot B," for example. The alpha scintillator 516 may be constructed of a material comprising a powdered zinc sulfide (silver-activated), for example, zinc sulfide being a material which is highly sensitive to visible light and has a substantially low response to either gamma ray or beta particle radiation.

Figure 3:
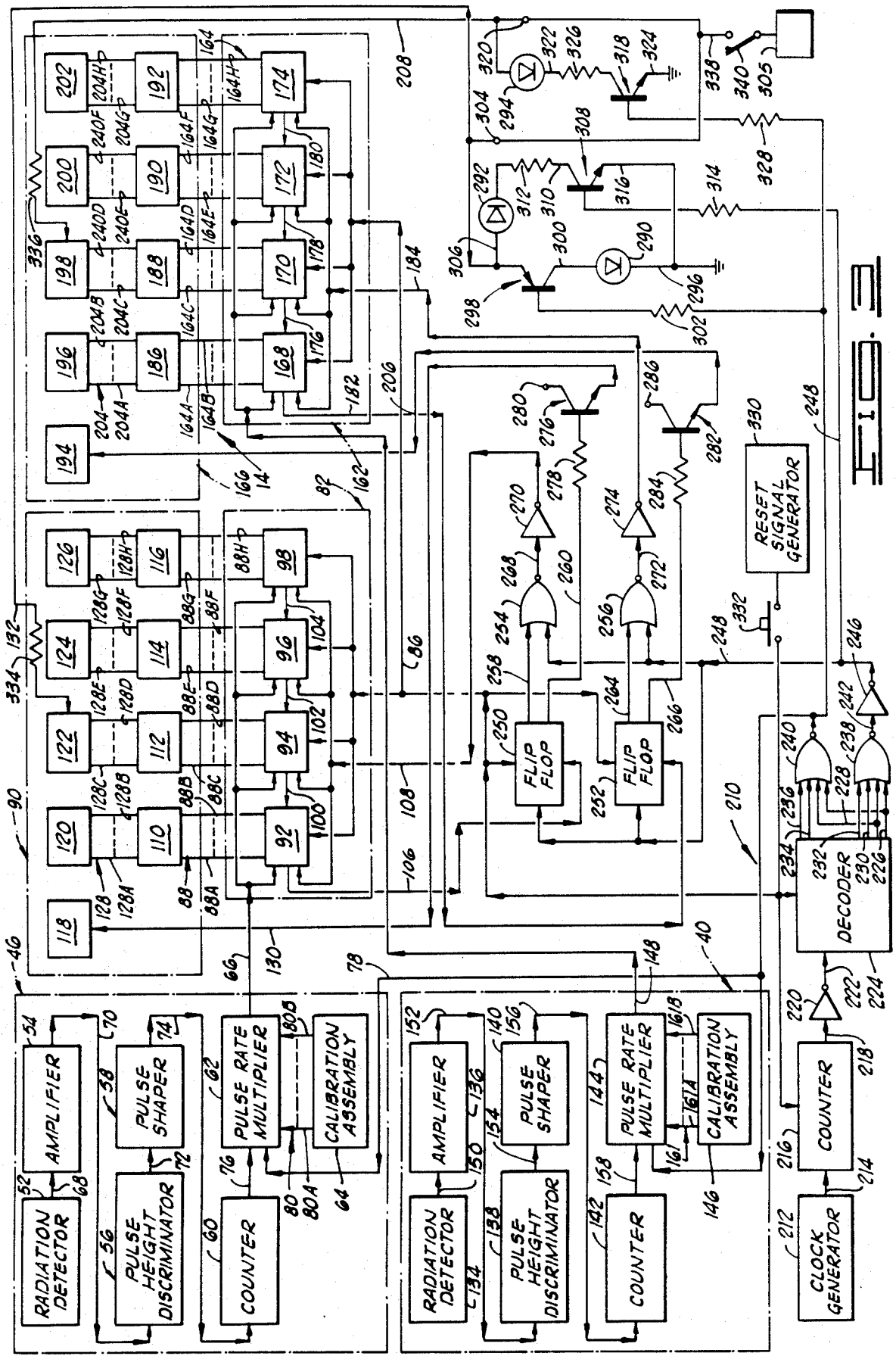
FIG. 3 is a schematic view of one preferred embodiment of the radiation activity indicator of FIG. 1.

Embodiment of FIG. 3

One preferred embodiment of the radiation activity indicator 14 is schematically and diagrammatically shown in greater detail in FIG. 3.

The alpha detector 46 includes a radiation detector 52, an amplifier 54, a pulse height discriminator 56, a pulse shaper 58, a counter 60, a pulse rate multiplier 62 and a calibration assembly 64. In general, the alpha detector 46 detects alpha particle activity from the radiation source 42 and provides the output indication 48. In this embodiment of the radiation activity indicator 14, the output indication 48, more particularly, is a digital pulse form of electrical output signal and is provided on a signal path 66, the output indication on the signal path 66 being indicative of the detected alpha particle activity.

The radiation detector 52 detects the alpha particle activity from a radiation source or, more particularly, from the radiation source 42 and provides an output signal on a signal path 68. In one form, the radiation detector 52 includes a scintillator material which emits optical photons in response to alpha particle radiation and a photomultiplier tube which converts the relatively short flashes of light into an electrical output signal, the output signal comprising a number of pulse type signals indicating the alpha particle activity passing through the scintillator material. Thus, the radiation detector 52 output signal on the signal path 68 indicates or represents a count of the alpha particles passing through the scintillator material, and the output signal on the signal path 68 is generally within the millivolts range.

The radiation detector 52 output signal is connected to and received by the amplifier 54, the amplifier 54 providing and amplified output signal on a signal path 70 in response to the received radiation detector 52 output signal. The amplifier 54 output signal on the signal path 70 is connected to and received via the pulse height discriminator 56. The pulse height discriminator 56 receives the amplifier 54 output signal and is constructed to pass only those received pulses having an amplitude which exceeds a predetermined minimum amplitude for filtering low amplitude noise signals and the like from the received amplifier 54 output signal, thereby substantially assuring that the pulse signals provided via the pulse height discriminator 56 output signal on a signal path 72 are indicative of the received signals provided in response to the detected alpha particle activity.

The pulse height discriminator 56 output signal on the signal path 72 is connected to and received by the pulse shaper 58 which is a circuit constructed to receive electrical signals generated in response to the detected alpha particle activity having varying amplitudes and to provide a digital form of output signal on a signal path 74. The pulse shaper 58 provides a digital output signal on the signal path 74 having a logical high amplitude value in response to each received input signal representing an alpha particle detected via the radiation detector 52, and thus the number of times the pulse shaper 74 output signal goes to a logical high amplitude value from a logical low amplitude value indicates the number of alpha particles detected from the radiation source 42.

The pulse shaper 58 output signal on the signal path 74 is connected to and received by the counter 60. The counter 60 is a digital type of counter and produces one output signal pulse on a signal path 76 in response to a predetermined number of input pulses connected thereto via the signal path 74, the counter 60 being of the type generally referred to in the art as a "divide" type of counter. The counter 60 reduces the number of digital pulses indicating the detected alpha particle activity by the predetermined number with respect to the number of digital pulses on the signal path 74, for reasons to be made more apparent below.

The counter 60 output signal on the signal path 76 is connected to and received by the pulse rate multiplier 62, the pulse rate multiplier 62 also receiving an enable signal via a signal path 78. The pulse rate multiplier 62 also receives a plurality of signals on signal path 80 provided via the calibration assembly 64, only the first and the last of the signal paths 80 being shown in FIG. 3 and designated therein via the general reference numerals 80A and 80B, respectively. The pulse rate multiplier 62 is a variable, digital counter type of network and is constructed to provide one (1) output signal pulse on the signal path 66 in response to receiving an enable signal in the low state on the signal path 78 and in response to receiving a determined number of input signal pulses connected thereto via the signal path 76, i.e. in response to receiving a determined number of counter 60 output signal pulses. The pulse rate multiplier 62 provides an output signal in the low state or, in other words, no output signal in response to receiving an enable signal on the signal path 78 in the high state. Thus, the alpha detector 46 is conditioned in the on condition in the low state of the enable signal and the alpha detector 46 is conditioned in the off condition in the high state of the enable signal.

The calibration assembly 64 output signals 80 are manually settable or controllable and the pulse rate multiplier 62 is adjustable to provide one (1) output signal pulse on the signal path 66 in response to receiving an adjustingly controlled number of input signal pulses on the signal path 76, the precise number of input signal pulses on the signal path 76 required to produce one (1) pulse rate multiplier 62 output signal pulse on the signal path 66 being adjustingly controlled via the calibration assembly 64 output signals on the signal paths 80 connected between the pulse rate multiplier 62 and the calibration assembly 64. In one form, the calibration assembly 64 comprises a plurality of manually operatable switches, each switch being connected to an electrical operating power supply and interposed in one of the signal paths 80, for example. In this form of the calibration assembly 62, the electrical operating power supply is connected to the pulse rate multiplier 62 via the signal paths 80 in the closed position of the switches and the electrical operating power supply is disconnected from the pulse rate multiplier 62 in the opened position of the switches, each switch connecting the electrical operating power supply to the pulse rate multiplier 62 via one of the signal paths 80 and the opened and closed positions of the switches controlling the number of input signal pulses on the signal path 76 required to produce one (1) output pulse on the signal path 66.

The alpha detector 46 output signal on the signal path 66 is connected to an received by an alpha counter assembly 82, the alpha counter assembly 82 also receiving a reset signal on a signal path 86. In the low state of the reset signal, the alpha counter assembly 82 counts the input signal pulses received on the signal path 66 and provides an output signal on a signal path assembly 88 indicating the number of received input signal pulses counted via the alpha counter assembly 82. The alpha counter assembly 82 is reset in response to receiving a reset signal on the signal path 86, the output signal on the signal path assembly 88 being switched to an output signal indicating a "zero" (0) count in response to receiving a reset signal on the signal path 86 in the high state.

The alpha counter assembly 82 output signal on the signal path assembly 88 is connected to and received by an alpha display indicator 90, and the alpha display indicator 90 is constructed to provide a perceivable output indication of the number of pulses counted via the alpha counter assembly 82, the output indication provided via the alpha display indicator 90 being in the form of a decimal numerical display in one preferred embodiment as shown in FIG. 3. The alpha counter assembly 82 output signal on the signal path assembly 88 represents the number of pulses received by the alpha counter assembly 82 on the signal path 66 and thus the output indication provided via the alpha display indicator 90 is representative of the alpha particle activity detected via the alpha detector 46.

The alpha counter assembly 82, more particularly, includes a plurality of up-down counters 92, 94, 96 and 98, and the alpha detector 46 output signal on the signal path 66 is connected to and received via each of the up-down counters 92, 94, 96 and 98, each of the up-down counters 92, 94, 96 and 98 also receiving the reset signal on the signal path 86. The up-down counter 92 is connected to the up-down counter 94 via a signal path 100, the up-down counter 94 is connected to the up-down counter 96 via a signal path 102 and the up-down counter 96 is connected to the up-down counter 98 via a signal path 104, the up-down counter 92 providing an alpha counter assembly 82 carry-out signal on a signal path 106.

The signal path assembly 88, more particularly, includes: a plurality of signal paths connected to the up-down counter 92 and to the alpha display indicator 90, the first and the last signal paths being shown in FIG. 3 and designated via the general reference numerals 88A and 88B, respectively; a plurality of signal paths connected to the up-down counter 94 and to the alpha display indicator 90, the first and the last signal paths being shown in FIG. 3 and designated via the general reference numerals 88C and 88D, respectively; a plurality of signal paths connected to the up-down counter 96 and to the alpha display indicator 90, the first and the last signal paths being shown in FIG. 3 and designated via the general reference numerals 88E and 88F, respectively; and a plurality of signal paths connected to the up-down counter 98 and to the alpha display indicator 90, the first and the last signal paths being shown in FIG. 3 and designated via the general reference numerals 88G and 88H, respectively. The up-down counter 98 provides an output signal via the signal paths 88G and 88H in response to each input signal pulse connected thereto via the alpha detector 46 output signal on the signal path 66, the up-down counter 96 provides an output signal via the signal path 88E and 88F in response to each ten (10) input signal pulses connected thereto via the alpha detector 46 output signal on the signal path 66, the up-down counter 94 provides an output signal via the signal paths 88C and 88D in response to each one hundred (100) input signal pulses connected thereto via the alpha detector 46 output signal on the signal path 66, and the up-down counter 92 provides an output signal via the signal paths 88A and 88B in response to each one thousand (1000) input signal pulses connected thereto via the alpha detector 46 output signal on the signal path 66, the up-down counters 92, 94, 96 and 98 being connected via the signal paths 100, 102 and 104 to provide the output signals just described. Thus, the up-down counters 92, 94, 96 and 98 are constructed to provide output signals via the signal path assembly 88 indicating the count of the alpha detector 46 output signal pulses as a four digit numerical indication with the up-down counter 98 output signal indicating the units digit count, the up-down counter 96 output signal indicating the tens digit count, the up-down counter 94 output signal indicating the hundreds digit count and the up-down counter 92 output signal indicating the thousands digit count.

An up-down enable signal on a signal path 108 is connected to and received by each of the up-down counters 92, 94, 96 and 98. Each of the up-down counters 92, 94, 96 and 98 is constructed to be conditioned in the count-up condition in the high state of the up-down enable signal on the signal path 108, and to be conditioned in the count-down condition in the low state of the up-down enable signal on the signal path 108. The generation of the up-down enable signal, the reset signal and the utilization of the carry out signal will be described in greater detail below.

The alpha display indicator 90 includes a plurality of BCD (binary coded decimal) to 7-segment converters 110, 112, 114 and 116, and a plurality of decimal display indicators 118, 120, 122, 124 and 126, the decimal display indicator 118 being sometimes referred to herein as the "minus sign decimal display indicator" for reasons to be made more apparent below. The converters 110, 112, 114 and 116 are each connected to one of the decimal display indicators 120, 122, 124 and 126 via a signal path assembly 128. More particularly, the converter 110 is connected to the decimal display indicator 120 via a plurality of signal paths (only the first and the last signal paths being shown in FIG. 3 and designated via the general reference numerals 128A and 128B, respectively); the converter 112 is connected to the decimal display indicator 122 via a plurality of signal paths (only the first and the last signal paths being shown in FIG. 3 and designated via the general reference numerals 128C and 128D, respectively); the converter 114 is connected to the decimal display indicator 124 via a plurality of signal paths (only the first and the last signal paths being shown in FIG. 3 and designated via the general reference numerals 128E and 128F, respectively); and the converter 116 is connected to the decimal display indicator 126 via a plurality of signal paths (only the first and the last signal paths being shown in FIG. 3 and designated via the general reference numerals 128G and 128H, respectively).

The up-down counters 92, 94, 96 and 98 each provide an output signal indicating or representing the number of input signal pulses counted by the up-down counter in the binary system of notation. Each of the BCD to 7-segment converters 110, 112, 114 and 116 receives the output signal from one of the up-down counters 92, 94, 96 and 98 and converts the received number from the BCD system of notation to the equivalent number in the 7-segment system of notation, each converter 110, 112, 114 and 116 providing an output signal on the signal path assembly 128 representing the number of input signal pulses detected by the alpha detector 46 and counted by the alpha counter assembly 82 in a BCD system of notation. Each of the decimal display indicators 120, 122, 124 and 126 receives the output signal from one of the converters 110, 112, 114 and 116 and provides a visually perceivable output indication displaying the number of alpha particles detected via the alpha detector 46 and counted via the alpha counter assembly 82, each of the decimal display indicators 120, 122, 124 and 126 being more particularly of the type generally referred to in the art as a 7-segment type of decimal display device or the like, for example.

The minus sign decimal display indicator 118 receives a signal via a signal path 130 and is constructed to display a visually perceivable output indication of a "minus" (−) sign when receiving a signal in the high state on the signal path 130, thereby indicating the numerals displayed via the remaining decimal display indicators 120, 122, 124 and 126 represent a negative (−) count (background), an absence of any visually perceivable output indication via the minus sign decimal display indicator 118 (the condition of the minus sign decimal display indicator 118 when receiving a signal in the low state on the signal path 130) indicating numerals displayed via the remaining decimal display indicators 120, 122, 124 and 126 represent a positive (+) count in this embodiment of the invention. The decimal display indicator 122 also receives a signal via a signal path 132 and provides a visually perceivable output indication of a "decimal point"(.) in response to receiving a signal in the high state on the signal path 132, for reasons to be made more apparent below.

The beta detector 40 is constructed similar to the alpha detector 46 and includes a radiation detector 134, an amplifier 136, a pulse height discriminator 138, a pulse shaper 140, a counter 142, a pulse rate multiplier 144 and a calibration assembly 146. In general, the beta detector 40 detects beta particle activity from the radiation source 42 and provides the output indication 44. The output indication 44, more particularly, is a digital pulse form of electrical output signal and is provided on a signal path 148, the output indication on the signal path 148 being indicative of the detected beta particle activity.

The radiation detector 134 detects the beta particle activity from a radiation source or, more particularly, from the radiation source 42 and provides an output signal on a signal path 150. In one form, the radiation detector 134 includes a scintillator material which emits optical photons in response to beta particle radiation and a photomultiplier tube which converts the relatively short flashes of light into an electrical output signal, the output signal comprising a number of pulse type signals indicating the beta particle activity passing through the scintillator material. Thus, the radiation detector 134 output signal on the signal path 150 indicates or represents a count of the beta particles passing through the scintillator material, and the output signal on the signal path 150 is generally within the millivolt range.

The radiation detector 134 output signal is connected to and received by the amplifier 136, the amplifier 136 providing an amplified output signal on a signal path 150 in response to the received radiation detector 134 output signal. The amplifier 136 output signal on the signal path 152 is connected to and received via the pulse height discriminator 138. The pulse height discriminator 138 receives the amplifier 136 output signal and is constructed to pass only those received pulses having an amplitude which exceeds a predetermined minimum amplitude for filtering low amplitude noise signals and the like from the received amplifier 136 output signal, thereby substantially assuring that the pulse signals provided via the pulse height discriminator 138 output signal on a signal path 154 are indicative of the received signals provided in response to the detected beta particle activity.

The pulse height discriminator 138 output signal on the signal path 154 is connected to and received by the pulse shaper 140 which is a circuit constructed to receive electrical signals generated in response to the detected alpha particle activity having varying amplitudes and to provide a digital form of output signal on a signal path 156. The pulse shaper 140 provides a digital output signal on the signal path 156 having a logical high amplitude value in response to each received input signal representing a beta particle detected via the radiation detector 134, and thus the number of times the pulse shaper 140 output signal goes to a logical high amplitude value from a logical low amplitude value indicates the number of beta particles detected from the radiation source 134.

The pulse shaper 134 output signal on the signal path 156 is connected to and received by the counter 142. The counter 142 is a digital type of counter and produces one output signal pulse on a signal path 158 in response to a predetermined number of input pulses connected thereto via the signal path 156, the counter 142 being of the type generally referred to in the art as a "divide" type of counter. The counter 142 reduces the number of digital pulses indicating the detected beta particle activity by the predetermined number with respect to the number of digital pulses on the signal path 156, for reasons to be made more apparent below.

The counter 142 output signal on the signal path 158 is connected to and received by the pulse rate multiplier 144, the puse rate multiplier 144 also receiving an enable signal via the signal path 78. The pulse rate multiplier 144 also receives a plurality of signals on signal path 161 provided via the calibration assembly 146, only the first and the last of the signal paths 161 being shown in FIG. 3 and designated therein via the general reference numerals 161A and 161B, respectively. The pulse rate multiplier 144 is a variable, digital counter type of network and is constructed to provide one (1) output signal pulse on the signal path 158 in response to receiving an enable signal in the high state on the signal path 78 and in response to receiving a determined number of input signal pulses connected thereto via the signal path 158, i.e. in response to receiving a determined number of counter 142 output signal pulses. The pulse rate multiplier 144 provides an output signal in the low state or, in other words, no output signal in response to receiving an enable signal on the signal path 78 in the low state. Thus, the beta detector 40 is conditioned in the on condition in the high state of the enable signal and the beta detector 40 is conditioned in the off condition in the low state of the enable signal, the same enable signal being utilized to condition the alpha detector 46 in the on and the off condition, in this embodiment of the invention.

The calibration assembly 146 output signals 161 are manually settable or controllable and the pulse rate multiplier 144 is adjustable to provide one (1) output signal pulse on the signal path 148 in response to receiving an adjustingly controlled number of input signal pulses on the signal path 158, the precise number of input signal pulses on the signal path 158 required to produce one (1) pulse rate multiplier 144 output signal pulse on the signal path 148 being adjustingly controlled via the calibration assembly 146 output signals on the signal paths 161 connected between the pulse rate multiplier 144 and the calibration assembly 146. In one form, the calibration assembly 146 comprises a plurality of manually operatable switches, each switch being connected to an electrical operating power supply and interposed in one of the signal paths 161, for example. In this form of the calibration assembly 146, the electrical operating power supply is connected to the pulse rate multiplier 144 via the signal paths 161 in the closed position of the switches and the electrical operating power supply is disconnected from the pulse rate multiplier 144 in the opened position of the switches, each switch connecting the electrical operating power supply to the pulse rate multiplier 144 via one of the signal paths 161 and the opened and closed positions of the switches controlling the number of input signal pulses on the signal path 158 required to produce one (1) output signal pulse on the signal path 148.

The beta detector 40 output signal on the signal path 148 is connected to and received by a beta counter assembly 162, the beta counter assembly 162 also receiving a reset signal on the signal path 86, the same reset signal connected to the alpha counter assembly 82. In the low state of the reset signal, the beta counter assembly 162 counts the input signal pulses received on the signal path 148 and provides an output signal on a signal path assembly 164 indicating the number of received input signal pulses counted via the beta counter assembly 162. The beta counter assembly 162 is reset in response to receiving a reset signal on the signal path 86, the output signal on the signal path assembly 164 being switched to an output signal indicating a "zero" (0) count in response to receiving a reset signal on the signal path 86 in the high state.

The beta counter assembly 162 output signal on the signal path assembly 164 is connected to and received by a beta display indicator 166, and the beta display indicator 166 is constructed to provide a perceivable output indication of the number of pulses counted via the beta counter assembly 162, the output indication provided via the beta display indicator 166 being in the form of a decimal numerical display in one preferred embodiment as shown in FIG. 3. The beta counter assembly 162 output signal on the signal path assembly 164 represents the number of pulses received by the beta counter assembly 162 on the signal path 148 and thus the output indication provided via the beta display indicator 166 is representative of the beta particle activity detected via the beta detector 40.

The beta counter assembly 162, more particularly, includes a plurality of up-down counters 168, 170, 172 and 174, and the beta detector 40 output signal on the signal path 148 is connected to and received via each of the up-down counters 168, 170, 172 and 174, each of the up-down counters 168, 170, 172 and 174 also receiving the reset signal on the signal path 86. The up-down counter 168 is connected to the up-down counter 170 via a signal path 176, the up-down counter 170 is connected to the up-down counter 172 via a signal path 178 and the up-down counter 172 is connected to the up-down counter 174 via a signal path 180, the up-down counter 168 providing a beta counter assembly 162 carry-out signal on a signal path 182.

The signal path assembly 164, more particularly, includes: a plurality of signal paths connected to the up-down counter 168 and to the beta display indicator 166, the first and the last signal paths being shown in FIG. 3 and designated via the general reference numerals 164A and 164B, respectively; a plurality of signal paths connected to the up-down counter 170 and to the beta display indicator 166, the first and the last signal paths being shown in FIG. 3 and designated via the general reference numerals 164C and 164D, respectively; a plurality of signal paths connected to the up-down counter 172 and to the beta display indicator 166, the first and the last signal paths being shown in FIG. 3 and designated via the general reference numerals 164E and 164F, respectively; and a plurality of signal paths connected to the up-down counter 174 and to the beta display indicator 166, the first and the last signal paths being shown in FIG. 3 and designated via the general reference numerals 164G and 164H, respectively. The up-down counter 174 provides an output signal via the signal paths 164G and 164H in response to each input signal pulse connected thereto via the beta detector 40 output signal on the signal path 148, the up-down counter 172 provides an output signal via the signal path 164E and 164F in response to each ten (10) input signal pulses connected thereto via the beta detector 40 output signal on the signal path 148, the up-down counter 170 provides on output signal via the signal paths 164C and 164D in response to each one hundred (100) input signal pulses connected thereto via the beta detector 40 output signal on the signal path 148, and the up-down counter 168 provides an output signal via the signal paths 164A and 164B in response to each one thousand (1000) input signal pulses connected thereto via the beta detector 40 output signal on the signal path 148, the up-down counters 92, 94, 96 and 98 being connected via the signal paths 176, 178 and 180 to provide the output signals just described. Thus, the up-down counters 168, 170, 172 and 174 are constructed to provide output signals via the signal path assembly 164 indicating the count of the beta detector 40 output signal pulses as a four digit numerical indication with the up-down counter 174 output signal indicating the units digit count, the up-down counter 172 output signal indicating the tens digit count, the up-down counter 170 output signal indicating the hundreds digit count and the up-down counter 168 output signal indicating the thousands digit count.

An up-down enable signal on a signal path 184 is connected to and received by each of the up-down counters 168, 170, 172 and 174. Each of the up-down counters 168, 170, 172 and 174 is constructed to be conditioned in the count-up condition in the high state of the up-down enable signal on the signal path 184, and to be conditioned in the count-down condition in the low state of the up-down enable signal on he signal path 184. The generation of the up-down enable signal, the reset signal and the utilization of the carry out signal will be described in greater detail below.

The beta display indicator 166 includes a plurality of BCD (binary coded decimal) to 7-segment converters 186, 188, 190 and 192, and a plurality of decimal display indicators 194, 196, 198, 200 and 202, the decimal display indicator 194 being sometimes referred to herein as the "minus sign decimal display indicator" for reasons to be made more apparent below. The converters 186, 188, 190 and 192 are each connected to one of the decimal display indicators 196, 198, 200 and 202 via a signal path assembly 204. More particularly, the converter 186 is connected to the decimal display indicator 196 via a plurality of signal paths (only the first and the last signal paths being shown in FIG. 3 and designated via the general reference numerals 204A and 204B, respectively); and the converter 188 is connected to the decimal display indicator 198 via a plurality of signal paths (only the first and the last signal paths being shown in FIG. 3 and designated via the general reference numerals 204C and 204D, respectively); the converter 190 is connected to the decimal display indicator 200 via a plurality of signal paths (only the first and the last signal paths being shown in FIG. 3 and designated via the general reference numerals 204E and 204F, respectively); and the converter 192 is connected to the decimal display indicator 202 via a plurality of signal paths (only the first and the last signal paths being shown in FIG. 3 and designated via the general reference numerals 204G and 204H, respectively).

The up-down counters 168, 170, 172 and 174 each provide an output signal indicating or representing the number of input signal pulses counted by the up-down counter in the binary system of notation. Each of the converters 186, 188, 190 and 192 receives the output signal from one of the up-down counters 168, 170, 172 and 174 and converts the received number from the BCD system of notation to the equivalent number in he 7-segment system of notation, each converter 186, 188, 190 and 192 providing an output signal on the signal path assembly 204 representing the number of input signal pulses detected by the beta detector 40 and counted by the beta counter assembly 162 in a 7-segment system of notation. Each of the decimal display indicators 196, 198, 200 and 202 receives the output signal from one of the converters 186, 188, 190 and 192 and provides a visually perceivable output indication displaying the number of beta particles detected via the beta detector 40 and counted via the beta counter assembly 162, each of the converters 196, 198, 200 and 202 being more particularly of the type generally referred to in the art as a 7-segment type of decimal display device or the like, for example.

The minus sign decimal display indicator 194 receives a signal via a signal path 206 and is constructed to display a visually perceivable output indication of a minus (−) sign when receiving a signal in the high state on the signal path 206, thereby indicating the numerals displayed via the remaining decimal display indicators 196, 198, 200 and 202 represent a negative (−) count, an absence of any visually perceivable output indications via the minus sign decimal display indicator 194 (the conditionof the minus sign decimal display indicator 194 when receiving a signal in the low state on the signal path 206) indicating numerals displayed via the remaining decimal display indicators 196, 198, 200 and 202 represent a positive (+) count in this embodiment of the invention. The decimal display indicator 198 also receives a signal via a signal path 208 and provides a visually perceivable output indication of a decimal point (.) in response to receiving a signal in the high state on the signal path 208, for reasons to be made more apparent below.

The radiation activity detector 14 includes a sequence control 210. In general, the sequence control 210 includes: a clock generator 212 providing periodic output clock signal pulses at a predetermined frequency on a signal path 214; a counter 216 receiving the clock signal pulses on the signal path 214 and providing an output signal pulse of a relatively short duration on a signal path 218 in response to receiving a predetermined number of clock signal pulses on the signal path 214; an inverter 220 receiving the counter 216 output signal pulses on the signal path 218, providing an output signal in the high state on a signal path 222 in response to receiving a signal in the low state and providing an output signal in the low state in response to receiving a signal in the high state; and a decoder 224.

The decoder 224 receives the signal pulses on the signal path 222 and provides output signals on a plurality of signal path 226, 228, 230, 232, 234 and 236. The decoder 224 is constructed such that the signal on each of the signal paths 226, 228, 230, 232, 234 and 236 is initially in the low state, and the decoder 224 sequentially changes the state of the signal on the decoder 224 output signal paths 226, 228, 230, 232, 234 and 236 in response to a positive going transition of the signal pulse on the signal path 222, the decoder 224 having seven (7) effective output signal terminals [the last three terminals (8), (9) and (10) of the decoder 224 are not utilized] and the output signal paths 226, 228, 230, 232, 234 and 236 being connected to each of the decoder 224 output terminals except a signal path is not connected to the fifth decoder 224 output terminal for reasons to be made more apparent below.

During the operation of the decoder 224, the signal on the signal path 226 is switched to the high state in response to the first received positive going transition of the signal pulse on the signal path 222; the signal on the signal path 228 is switched to the high state and the signal on the signal path 226 is switched from the high state to the low state in response to the second received positive going transition of the signal pulse on the signal path 222; the signal on the signal path 230 is switched to the high state and the signal on the signal path 228 is switched from the high state to the low state in response to the third received positive going transition of the signal pulse on the signal path 222; the signal on the signal path 232 is switched to the high state and the signal on the signal path 230 is switched from the high state to the low state in response to the fourth received positive going transition of the signal pulse on the signal path 222; the signal on the signal path 232 is switched from the high state to the low state in response to the fifth received positive going transition of the signal pulse on the signal path 222; the signal on the signal path 234 is switched to the high state in response to the sixth received positive going transition of the signal on the signal path 222; and the signal on the signal path 236 is switched to the high state and the signal on the signal path 234 is switched from the high state to the low state in response to the seventh received positive going transision of the signal pulse on the signal path 222. It should be noted that the states of the signals on the signal paths 226, 228, 230, 232, 234 and 236 are not switched in response to the fifth received positive going transition of the signal pulse on the signal path 222 since a signal path is not connected to the fifth decoder 224 output terminal as mentioned before. The state of the decoder 224 output signal paths 226, 228, 230, 232, 234 and 236 is summarized in TABLE II below wherein the letter symbol H is utilized to designate a logical high state and the letter symbol L is utilized to designate a logical low state.

TABLE II

| Positive going transitions of the signal pulse on the signal path 222 | DECODER 224 OUTPUT SIGNALS | | | | | |
|---|---|---|---|---|---|---|
| | Signal Path 226 | Signal Path 228 | Signal Path 230 | Signal Path 232 | Signal Path 234 | Signal Path 236 |
| First | H | L | L | L | L | L |
| Second | L | H | L | L | L | L |
| Third | L | L | H | L | L | L |
| Fourth | L | L | L | H | L | L |
| Fifth | L | L | L | L | L | L |
| Sixth | L | L | L | L | H | L |
| Seventh | L | L | L | L | L | H |

The decoder 224 output signals on the first four (4) signal paths 226, 228, 230 and 232 are each connected to and received via a first NOR gate 238, and the decoder 224 output signals on the sixth and seventh signal paths 234 and 236 are each connected to and received via a second NOR gate 240, the second NOR gate 240 also receiving decoder 224 output signals on the first and the second signal paths 226 and 228. The first NOR gate 238 is constructed to provide an output signal on a signal path 242 in the low state in response to receiving a signal in the "high" state on any of the signal paths 226, 228, 230 and 232. The second NOR gate 240 is constructed to provide an output signal in the low state on the signal path 78 in response to receiving a signal in the high state on any of the signal paths 226, 228, 234 and 236, the second NOR gate 240 providing the enable signal on the signal path 78.

The clock generator 212, the counter 216 and the inverter 220 cooperate to provide a positive going transition output signal on the signal path virtually instantaneously after the radiation activity indicator 14 is conditioned in the on condition, thereby causing the decoder 224 output signal on the signal path 226 to be switched from the low to the high state. In the high state of the signal on the signal path 226, the second NOR gate 240 provides an output signal in the low state on the signal path 78 or, in other words, provides the enable signal in the low state on the signal path 78 for conditioning the beta detector 40 and the alpha detector 46 in the on condition at a time represented in FIG. 2 via the symbol ($t_0$). The signal on the signal path 222 is a short duration pulse type of signal, as mentioned before, and thus the signal on the signal path 222 is switched from the high state to the low state within a relatively short period of time after the start time ($t_0$); however, decoder 224 output signals are not changed in response to this negative going transition of the signal on the signal path 222.

In one operational embodiment generally referred to before, the clock generator 212, the counter 216 and the inverter 220 cooperate to provide a signal on the signal path 222 having a periodic positive going transition, the period being substantially equal to thirty (30) seconds in this embodiment. Thus, approximately thirty (30) seconds after the starting time ($t_0$), pulse having a second positive going transition appears on the signal path 222 and the decoder 224 switches the condition of the decoder 224 output signal in response thereto, the signal on the signal path 226 being switched from the high state to the low state and the signal on the signal path 228 is switched from the low state to the high state. In the high state of the signal on the signal path 228, the second NOR gate 240 provides the enable signal in the low state on the signal path 78 for maintaining the beta detector 40 and the alpha detector 46 conditioned in the on condition.

Approximately thirty (30) seconds after the second positive going transition appeared on the signal path 222, a signal having a third positive going transition appears on the signal path 222 and the decoder 224 switches the condition of the decoder 224 output signal in response thereto, the signal on the signal path 228 being switched from the high state to the low state and the signal on the signal path 230 being switched from the low to the high state. In this condition, each of the signals on the signal paths 226, 228, 234 and 236 are in the low state and the second NOR gate 240 switches the enable signal on the signal path 78 to the high state. Thus, the enable signal provided via the second NOR gate 240 output signal is switched to the low state at a time ($t_0$), remains in the low state for sixty (60) seconds, and is switched to the high state at the end of the sixty (60) second period of time at a time ($t_1$), this phase of the operation of the present invention constituting the background count period of time as illustrated in FIG. 2.

Approximately thirty (30) seconds after the third positive going transition appeared on the signal path 222 [ninety (90) seconds from time ($t_0$)], a signal having a fourth positive going transition appears on the signal path 222 and the decoder 224 switches the condition of the decoder 224 output signal in response thereto, the signal on the signal path 230 being switched from the high to the low state and the signal on he signal path 232 being switched from the low to the high state. In this condition, each of the signals on the signal paths 226, 228, 234 and 236 are in the low state and the enable signal provided on the signal path 78 via the second NOR gate 240 is in the high state.

Approximately thirty (30) seconds after the fourth positive going transition appeared on the signal path 222 [one hundred twenty (120) seconds from time ($t_0$)], a signal having a fifth positive going transition appears on the signal path 222 and the decoder 224 output signal on the signal path 232 is switched from the high state to the low state in response to the fifth positive going transition. The enable signal provided via the second NOR gate 240 remains in the high state.

Approximately thirty (30) seconds after the fifth positive going transition appeared on the signal path 222 [one hundred fifty (150) seconds from time ($t_0$)], a signal having a sixth positive going transition appears on the signal path 222 and the decoder 224 switches the condition of the decoder 224 output signal response thereto, the signal on the signal path 234 being switched from the low to the high state. In this condition, the second NOR gate 240 receives the decoder 224 output signal in the high state on the signal path 234 and provides the enable signal on the signal path 78 in the low state at a time ($t_3$) as shown in FIG. 2.

Approximately thirty (30) seconds after the sixth positive going transition appeared on the signal path 222 [one hundred eighty (180) seconds from time ($t_0$)], a signal having a seventh positive going transition appears on the signal path 222 and the decoder 224 switches the condition of the decoder 224 output signal in response thereto, the signal on the signal path 234 being switched from the high state to the low state and the signal on the signal path 236 being switched from the low state to the high state. In this condition, the second NOR gate 240 receives the decoder 224 output signal in the high state on the signal path 236 and continues to provide the enable signal on the signal path 78 in the low state.

Approximately thirty (30) seconds after the seventh positive going transition appeared on the signal path 222 [two hundred ten (210) seconds from time ($t_0$)], a signal having an eighth positive going transition appears on the signal path 222 and the decoder 224 switches the condition of the decoder 224 output signal to provide a signal in the low state on each of the decoder 224 output signal paths. Thus, the second NOR gate 240 switches the enable signal from the low state to the high state in response to the received decoder 224 output signals in the low state on the signal paths 226, 228, 234 and 236, the enable signal remaining in the low state for sixty (60) seconds from a time ($t_3$) to a time ($t_4$) during the radiation count period of time as indicated in FIG. 2.

The first NOR gate 238 output signal on the signal path 242 is connected to and received via an inverter 246, and the inverter 246 provides an output signal in the high state in response to receiving a signal in the low state on the signal path 242, the inverter 246 providing an output signal in the low state in response to receiving a signal in the high state on the signal path 242.

The inverter 246 output signal on the signal path 248 is connected to and received by a first flip-flop circuit 250, a second flip-flop cirucit 252, one of the inputs of a NOR gate 254 and one of the inputs of a NOR gate 256. The first and the second flip-flop circuits 250 and 252 are similarly constructed and each is a two-stage type of multivibrator circuit having two stable conditions.

The first flip-flop circuit 250 receives a signal on the signal path 248 (sometimes referred to herein as a "trigger" signal) and provides two output signals via a pair of signal paths 258 and 260. The signal on the signal path 258 is in the low state and the signal on the signal path 260 is in the high state in response to a received trigger signal in the low state on the signal path 248, the signal on the signal path 258 being switched from the low to the high state and the signal on the signal path 260 being switched from the high state to the low state in response to receiving a trigger signal in the high state on the signal path 248. the first flip-flop circuit 250 also receives a reset signal via the signal path 86, and the first flip-flop circuit 250 is reset or conditioned to provide an output signal in the low state on the signal path 258 and an output signal in the high state on the signal path 260 in response to receiving a reset signal in the high state on the signal path 86. The alpha counter assembly 82 carry out signal on the signal path 106 is connected to and received via the first flip-flop circuit 250, and the first flip-flop circuit 250 is reset or conditioned to provide an output signal in the low state on the signal path 258 and an output signal in the high state on the signal path 260 in response to receiving the alpha counter assembly 82 carry out signal in the high state on the signal path 106.

The second flip-flop circuit 252 receives the trigger signal on the signal path 248 and provides two output signals via a pair of signal paths 264 and 266. The signal on the signal path 264 is in the low state and the signal on the signal path 266 is in the high state in response to a received trigger signal in the low state on the signal path 248, the signal on the signal path 264 being switched from the low state to the high state and the signal on the signal path 266 being switched from the high state to the low state in response to receiving a trigger signal in the high state on the signal path 248. The second flip-flop circuit 252 also receives a reset signal via the signal path 86, and the second flip-flop circuit 252 is reset or conditioned to provide an output signal in the low state on the signal path 264 and an output signal in the high state on the signal path 266 in response to receiving a reset signal in the high state on the signal path 86. The beta counter assembly 162 carry out signal on the signal path 182 is connected to and received by the second flip-flop circuit 252, and the second flip-flop circuit 252 is reset or conditioned to provide an output signal in the low state on the signal path 264 and an output signal in the high state on the signal path 266 in response to receiving the beta counter assembly 162 carry out signal in the high state on the signal path 182.

The NOR gate 254 receives the two input signals on the signal paths 258 and 248 and provides an output signal on a signal path 268 in the low state in response to receiving a signal in the high state on either the signal path 258 or the signal path 248. The NOR gate 254 output signal on the signal path 268 is connected to and received by an inverter 270, and the inverter 270 provides an output signal in the high state on the signal path 108 in response to receiving an input signal in the low state on the signal path 268, the inverter 270 providing an output signal in the low state on the signal path 108 in response to receiving an input signal in the high state on the signal path 268. Thus, the NOR gate 254 provides the up-down enable signal on the signal path 108.

The NOR gate 256 receives the two input signals on the signal paths 248 and 264 and provides an output signal on a signal path 272 in the low state in response to receiving a signal in the high state on either the signal path 264 or the signal path 248. The NOR gate 256 output signal on the signal path 272 is connected to and received by an inverter 274, and the inverter 274 provides an output signal in the high state on the signal path 184 in response to receiving an input signal in the low state on the signal path 272, the inverter 274 providing an output signal in the low state on the signal path 184 in response to receiving an input signal in the high state on the signal path 272. Thus, the NOR gate 256 provides the up-down enable signal on the signal path 184.

The first flip-flop circuit 250 output signal on the signal path 260 is connected to a first switch 276 and a resistor 278 is interposed in the signal path 260 between the first switch 276 and the first flip-flop circuit 250. The first switch 276, more particularly, is a switching transistor (the first switch 276 being sometimes referred to herein as the first switching transistor 276) and the signal path 260 is connected to the base of the first switching transistor 276. The collector of the first switching transistor 276 is connected to a terminal 280, and the emitter of the first switching transistor 276 is connected to the minus sign decimal display indicator 118 via the conductor 130, the minus sign decimal display indicator 118 providing an output perceivable indication of a minus (−) sign when receiving the first switch 276 output signal in the high state on the signal path 130. The terminal 280 is connected to an electrical operating power supply and the first switching transistor 276 is conditioned in the off condition providing an output signal in the low state on the signal path 130 in the low state of the first flip-flop circuit 250 output signal on the signal path 260, the first switching transistor 276 being conditioned in the on or conducting condition providing an output signal in the high state on the signal path 130 in the high state of the first flip-flop circuit 250 output signal on the signal path 260.

The second flip-flop circuit 252 output signal on the signal path 266 is connected to a second switch 282 and a resistor 284 is interposed in the signal path 266 between the second switch 282 and the second flip-flop circuit 252. The second switch 282, more particularly, is a switching transistor (the second switch 282 being sometimes referred to herein as the "second switching transistor 282") and the signal path 266 is connected to the base of the second switching transistor 282. The collector of the second switching transistor 282 is connected to a terminal 286, and the emitter of the second switching transistor 282 is connected to the minus sign decimal display indicator 184 via the conductor 206, the minus sign decimal display indicator 194 providing an output perceivable indication of a minus (−) sign when receiving the second switch 282 output signal in the high state on the signal path 206. The terminal 286 is connected to an electrical operating power supply and the second switching transistor 282 is conditioned in the off condition providing an output signal in the low state on the signal path 206 in the low state of the second flip-flop circuit 252 output signal on the signal path 266, the second switching transistor 282 being conditioned in the on or conducting condition providing an output signal in the high state on the signal path 206 in the high state of the second flip-flop circuit 252 output signal on the signal path 266.

The first and the second NOR gates 238 and 240, the inverter 246, the first and the second flip-flop circuits 250 and 252, the NOR gates 254 and 256, the inverters 270 and 274, and the first and the second switches 276 and 282 each cooperate and comprise a portion of the sequence control 210. The sequence control 210 provides the output signals for controlling the operation in accordance with the method and the apparatus of the present invention and in a manner to be described in greater detail below.

The radiation activity indicator 14 also includes: an alpha-beta indicator lamp 290 providing a perceivable output indication in a lighted condition for indicating the alpha and the beta counter assemblies 82 and 162 are each conditioned in the counting mode; a sample indicator lamp 292, having a lighted condition, providing a perceivable output indication in the lighted condition indicating the timing for the accumulation of the sample (the sample period of time); and a read indicator lamp 294, having a lighted condition, providing a perceivable output indication in the lighted condition indicating a count of the detected alpha and beta activities is available for display on the alpha and the beta display indicators 90 and 166. More particularly, the indicator lamps 290, 292 and 294 are each light emitting diodes, as schematically indicated in FIG. 3, and the indicator lamps 290, 292 and 294 each emit light when biased in the forward direction.

The alpha-beta indicator lamp 290 is connected to ground via a signal path 296 and to a third switch 298 via a signal path 300, the third switch 298 being a switching transistor and sometimes referred to herein as the "third switching transistor 298". The base of the third switching transistor 298 is connected to the signal path 78 and a resistor 320 as interposed in the signal path 78, generally between the third switching transistor 298 and the second NOR gate 240. The emitter of the third switching transistor 298 is connected to the signal path 132, and the signal path 132 is connected to a terminal 304 which is connected to an electrical operating power supply 305, the collector of the third switching transistor 298 being connected to the alpha-beta indicator lamp 290 via the signal path 300. The third switching transistor 298 is conditioned in the on or conducting condition in the low state of the signal on the signal path 78, and the third switching transistor 298 is conditioned in the off or non-conducting condition in the high state of the signal on the signal path 78. In the on condition of the third switching transistor 298, the alpha-beta indicator lamp 290 is forward biased and conditioned in the lighted condition.

The sample indicator lamp 292 is connected to the signal path 132 via a signal path 306 and to a fourth switch 308 via a signal path 310, the fourth switch 308 being a switching transistor and sometimes referred to herein as a fourth switching transistor 308. A resistor 312 is interposed in the signal path 310 between the fourth switching transistor 308 and the sample indicator lamp 292. The base of the fourth switching transistor 308 is connected to the signal path 248 and a resistor 314 is interposed in the signal path 248, generally between the base of the fourth switching transistor 308 and the inverter 246, the emitter of the fourth switching transistor 308 being connected to ground via a signal path 316. The fourth switching transistor 308 is conditioned in the off or non-conducting condition in the low state of the signal on the signal path 248 and the fourth switching transistor 308 is conditioned in the on or conducting condition in the high state of the signal on the signal path 248. The sample indicator lamp 292 is forward biased and conditioned in the lighted condition in the on condition of the fourth switching transistor 308.

The read indicator lamp 294 is connected to the conductor 208 and to a fifth switch 318, the fifth switch 318 being a switching transistor and sometimes referred to herein as the "fifth switching transistor". The signal path 208 is connected to a terminal 320 which is connected to the electrical operating power supply 305. More particularly, the read indicator lamp 294 is connected to the collector of the fifth switching transistor 318 via a signal path 322 and the emitter of the fifth switching transistor 318 is connected to ground via a signal path 324, the base of the fifth switching transistor 318 being connected to the signal path 78 between the fifth switching transistor 318 and the NOR gate 240. A resistor 326 is interposed in the conductor 322 between the read indicator lamp 294 and the fifth switching transistor 318, and a resistor 328 is interposed in the signal path 78, generally between the fifth switching transistor 318 and the NOR gate 240. The fifth switching transistor 318 is conditioned in the on or conducting condition in the high state of the signal on the signal path 78, and the fifth switching transistor 318 is conditioned in the off or non-conducting state in the low state of the signal on the signal path 78, the read indicator lamp 294 being forward biased and conditioned in the lighted condition in the on condition of the fifth switching transistor 318.

The sequence control 210 also includes a reset signal generator 330 which may constitute an electrical operating power source, for example, the reset signal generator 330 providing the reset signal on the signal path 86. A push-button type of switch 332 is interposed in the signal path 86. In the opened position of the switch 332, electrical continuity is interrupted between the reset signal generator 330 and the signal path 86, and the reset signal on the signal path 86 is in the low state. In the closed position of the switch 332, electrical continuity is established between the reset signal generator 330 and the signal path 86, and the reset signal on the signal path 86 is in the high state.

A resistor 334 is interposed in the signal path 132, generally between the decimal display indicator 122 and the electrical operating power supply 305. A resistor 336 is interposed in the signal path 208, between the decimal display indicator 198 and the electrical operating power supply 305.

The alpha-beta indicator lamp 290, the sample indicator lamp 292 and the read indicator lamp 294 comprise a portion of the output indicator 50, and the sequence control 210 also comprises a portion of the output indicator 50 in the embodiment of the radiation activity indicator 14 shown in FIG. 3. The alpha and the beta counter assemblies 82 and 162, and the alpha and beta display indicators 90 and 166 also comprise a portion of the output indicator 50.

The electrical operating power supply 305 is connected to the terminals 304 and 320 via a signal path 338 and an on-off switch 340 is interposed in the signal path 338, the electrical operating power supply 305 also being connected to the terminals 280 and 286. In the closed position of the switch 340, the electrical operating power supply 305 is connected to the terminals 280, 286, 304 and 320 and to the various electrical components and assemblies of the radiation activity indicator 14 (all of the connections between the electrical operating power supply 305 and the various electrical components and assemblies are not shown for the purpose of clarity) and the radiation activity indicator 14 is conditioned in the on or operating condition. In the opened position of the switch 340, the electrical operating power supply 305 is disconnected (electrical continuity is interrupted) and the radiation activity indicator 14 is conditioned in the off, non-operating condition. It should be noted that the various electrical components and assemblies of the radiation activity indicator 14 generally require an electrical operating power supply having a direct current potential of approximately nine (9) to ten (10) volts; however, the radiation detectors 52 and 134 required a relatively higher direct current potential of approximately seven hundred (700) volts, for example, in one operational embodiment for operating a photomultiplier tube type of radiation detector and, in this embodiment, a high voltage type of electrical operating power supply is incorporated within the electrical operating power supply 305 for operating the radiation detectors 52 and 134.

The radiation activity indicator 14 shown in FIG. 3 is constructed for operation in accordance with the present invention and the timing of the operation of the present invention is diagrammatically shown in FIG. 2, as described before. After the sample collector 12 has been properly positioned for collecting the sample, the radiation activity indicator 14 is conditioned in the on condition by closing the switch 340, thereby connecting the electrical operating power supply 305 to the various electrical components and assemblies of the radiation activity detector 14. The reset switch 332 is then depressed thereby providing the reset signal on the signal path 86 in the high state for initiating the start of the operation of the present invention at a time designated by the symbol ($t_0$) in FIG. 2.

The enable signal on the signal path 78 is switched to the low state at the time ($t_0$), thereby conditioning the pulse rate multipliers 62 and 144 in the on conditions. In the low state of the enable signal on the signal path 78, the alpha detector 46 provides the output signal on the signal path 66 and the beta detector 40 provides the output signal on the signal path 148.

The first NOR gate 238 output signal on the signal path 242 is in the low state at the time ($t_0$) and the inverter 246 output signal on the signal path 248 (the trigger signal) is in the high state. Assuming the reset switch 332 has been depressed or closed, the first flip-flop circuit 250 is conditioned to provide the output signal on the signal path 258 in the low state and the output signal on the signal path 260 is in the high state, the carry out signals on the signal paths 106 and 182 each being in the low state. The NOR gate 254 output signal on the signal path 268 is in the low state since the signal on the signal path 248 is in the high state and thus the inverter 270 output signal on the signal path 108 (the up-down enable signal) is in the high state, thereby conditioning the alpha counter assembly 82 in the count-up mode. Since the first flip-flop circuit 250 output signal on the signal path 260 is in the high state at time ($t_0$), the first switch 276 is conditioned in the conducting condition, thereby providing an output signal on the signal path 130 in the high state for conditioning the minus sign decimal display indicator 118 for displaying the minus (−) sign. At time ($t_0$) the alpha counter assembly 82 is conditioned in the count-up mode and the minus sign is displayed via the minus sign decimal display indicator 118, the alpha counter assembly 82 counting the alpha detector 46 output signal pulses on the signal path 66 for display via the decimal display indicators 120, 122, 124 and 126 and the minus sign displayed via the minus sign decimal display indicator 118 indicating the count displayed via the decimal display indicators 120, 122, 124 and 126 represents a negative (−) count.

In the above-described condition at time ($t_0$), the second flip-flop circuit 252 provides an output signal on the signal path 264 in the low state and an output signal on the signal path 266 in the high state. The NOR gate 256 provides an output signal in the low state on the signal path 272 in response to the received signal on the signal path 248 in the high state, the inverter 274 output signal on the signal path 184 (up-down enable signal) being in the high state. In the high state of the up-down enable signal on the signal path 184, the beta counter assembly 162 is conditioned in the count-up mode. The second flip-flop circuit 252 output signal on the signal path 266 is in the high state thereby conditioning the second switch 282 in the conducting condition. In the conducting condition of the second switch 282, the signal on the signal path 206 is in the high state and the minus sign decimal display indicator 194 displays the minus (−) sign. Thus, at time ($t_0$) the beta counter assembly 162 is conditioned in the count-up mode and the minus (−) sign is displayed via the minus sign decimal display indicator 194, the beta counter assembly 162 counting the output signal pulses on the signal pulses on the signal path 148 for display via the decimal display indicators 196, 198, 200 and 202 and the minus sign displayed via the decimal display indicator 194 indicating the count displayed via the decimal display indicators 196, 198, 200 and 202 represents a negative (−) count.

At the time ($t_0$), the enable signal on the signal path 78 is in the low state and thus, the third switch 298 is conditioned in the conducting condition, thereby conditioning the alpha-beta lamp indicator 290 in the lighted condition for indicating the alpha and the beta counter assemblies 82 and 162 are each conditioned in the counting mode. The sample indicator lamp 292 is conditioned in the lighted condition since a high signal on the signal path 248 is connected to the fourth switch 308 for conditioning the fourth switch 308 in the conducting condition, the lighted sample lamp indicator 292 providing a perceivable output indication indicating that the sample collector 12 is collecting the sample. The enable signal in the low state is connected to the fifth switch 318 for conditioning the fifth switch 318 in the off or non-conducting condition, thereby conditioning the read indicator lamp 294 in the off condition.

When the switch 340 is closed, the electrical operating power supply 305 is connected to a portion of the decimal display indicator 122 and to a portion of the decimal display indicator 198. Thus, the decimal display indicators 122 and 198 continue to display a decimal point (.) during the operation of the radiation activity indicator 14 from the start time ($t_0$) until the switch 340 is opened to condition the radiation activity indicator 14 in the off condition.

The condition of the radiation activity indicator 14, after depressing the reset switch 332 and at a time ($t_0$), is summarized in TABLE III, below.

TABLE III

| | | |
|---|---|---|
| 1. | The enable signal on the signal path 78 | LOW |
| 2. | The trigger signal on the signal path 248 | HIGH |
| 3. | The alpha detector 46 | ON |
| 4. | The beta detector 40 | ON |
| 5. | The up-down enable signal on the signal path 108 | HIGH |

TABLE III-continued

| | | |
|---|---|---|
| 6. | The alpha counter assembly 82 | COUNT-UP MODE |
| 7. | The up-down enable signal on the signal path 184 | HIGH |
| 8. | The beta counter assembly 162 | COUNT-UP MODE |
| 9. | The signal on the signal path 130 connected to the minus sign decimal display indicator 118 | HIGH |
| 10. | The signal on the signal path 206 connected too the minus sign decimal display indicator 194 | HIGH |
| 11. | The reset signal on the signal path 86 | LOW |
| 12. | The carry out signal on the signal path 106 | LOW |
| 13. | The carry out signal on the signal path 182 | LOW |
| 14. | The alpha-beta indicator lamp 298 | LIGHTED |
| 15. | The sample indicator lamp 292 | LIGHTED |
| 16. | The read indicator lamp 318 | OFF |

The radiation activity indicator 14 remains in the condition summarized in TABLE III above from the time ($t_0$) to the time ($t_1$). At the time ($t_1$), the alpha and beta detectors 46 and 40 are each conditioned in the off condition and the read indicator lamp 294 is conditioned in the lighted condition, thereby providing a perceivable output indication indicating that a count is available for display via the alpha and the beta display indicators 90 and 166. At the time ($t_1$), the radiation activity indicator 14 is conditioned as summarized in TABLE IV, below.

TABLE IV

| | | |
|---|---|---|
| 1. | The enable signal on the signal path 78 | HIGH |
| 2. | The trigger signal on the signal path 248 | HIGH |
| 3. | The alpha detector 46 | OFF |
| 4. | The beta detector 40 | OFF |
| 5. | The up-down enable signal on the signal path 108 | HIGH |
| 6. | The alpha counter assembly 82 | COUNT-UP MODE |
| 7. | The up-down enable signal on the signal path 184 | HIGH |
| 8. | The beta counter assembly 162 | COUNT-UP MODE |
| 9. | The signal on the signal path 130 connected to the minus sign decimal display indicator 118 | HIGH |
| 10. | The signal on the signal path 206 connected to the minus sign decimal display indicator 194 | HIGH |
| 11. | The reset signal on the signal path 86 | LOW |
| 12. | The carry out signal on the signal path 106 | LOW |
| 13. | The carry out signal on the signal path 182 | LOW |
| 14. | The alpha-beta indicator lamp 298 | OFF |
| 15. | The sample indicator lamp 292 | LIGHTED |
| 16. | The read indicator lamp 318 | ON |

The radiation activity indicator 14 remains in the condition summarized in TABLE IV, above, from the time ($t_1$) to the time ($t_2$). At the time ($t_2$), the sample indicator lamp 292 is switched from the lighted condition to the off condition, thereby providing a perceivable output indication indicating the termination of the sample period of time [from time ($t_0$) to time ($t_2$)] and indicating the start of the transfer period of time, the condition of the radiation activity indicator 14 at the time ($t_2$) being summarized in TABLE V, below.

TABLE V

| | | |
|---|---|---|
| 1. | The enable signal on the signal path 78 | HIGH |
| 2. | The trigger signal on the signal path 248 | LOW |

TABLE V-continued

| | |
|---|---|
| 3. The alpha detector 46 | OFF |
| 4. The beta detector 40 | OFF |
| 5. The up-down enable signal on the signal path 108 | LOW |
| 6. The alpha counter assembly 82 | COUNT-DOWN MODE |
| 7. The up-down enable signal on the signal path 184 | LOW |
| 8. The beta counter assembly 162 | COUNT-DOWN MODE |
| 9. The signal on the signal path 130 connected to the minus sign decimal display indicator 118 | HIGH |
| 10. The signal on the signal path 206 connected to the minus sign decimal display indicator 194 | HIGH |
| 11. The reset signal on the signal path 86 | LOW |
| 12. The carry out signal on the signal path 106 | LOW |
| 13. The carry out signal on the signal path 182 | LOW |
| 14. The alpha-beta indicator lamp 298 | OFF |
| 15. The sample indicator lamp 292 | OFF |
| 16. The read indicator lamp 318 | LIGHTED |

The radiation activity indicator 14 remains in the condition summarized in TABLE V, above, from the time ($t_2$) to the time ($t_3$). At the time ($t_3$), the alpha and the beta detectors 46 and 40 are each conditioned in the on condition, and the alpha and the beta counter assemblies 82 and 162 are each initially conditioned in the count-down mode. The beginning of the transfer period of time at the time ($t_2$) is indicated via the conditioning of the sample indicator lamp 292 in the off condition, and the termination of the transfer period of time at the time ($t_3$) is indicated via the conditioning of the alpha-beta indicator lamp 298 in the lighted condition. It should be noted that a separate indicator lamp can be incorporated for more specifically indicating the initiation and the termination of the transfer period of time at the times ($t_2$) and ($t_3$), respectively, if desired in a particular application. The condition of the radiation activity indicator 14 at the time ($t_3$) being summarized in TABLE VI, below.

TABLE VI

| | |
|---|---|
| 1. The enable signal on the signal path 78 | LOW |
| 2. The trigger signal on the signal path 248 | LOW |
| 3. The alpha detector 46 | ON |
| 4. The beta detector 40 | ON |
| 5. The up-down enable signal on the signal path 108 | LOW |
| 6. The alpha counter assembly 82 | COUNT-DOWN MODE |
| 7. The up-down enable signal on the signal path 184 | LOW |
| 8. The beta counter assembly 162 | COUNT-DOWN MODE |
| 9. The signal on the signal path 130 connected to the minus sign decimal display indicator 118 | HIGH |
| 10. The signal on the signal path 206 connected to the minus sign decimal display indicator 194 | HIGH |
| 11. The reset signal on the signal path 86 | LOW |
| 12. The carry out signal on the signal path 106 | LOW |
| 13. The carry out signal on the signal path 182 | LOW |
| 14. The alpha-beta indicator lamp 298 | LIGHTED |
| 15. The sample indicator lamp 292 | OFF |
| 16. The read indicator lamp 318 | OFF |

The alpha and the beta counter assemblies 82 and 162 are each conditioned in the count-down mode at the time ($t_3$) [the beginning of the radiation count period of time]. Thus, the count accumulated on the alpha and the beta counter assemblies 82 and 162 during the background count period of time from the time ($t_0$) to the time ($t_3$) initially is counted down via the alpha and the beta counter assemblies 82 and 162. When the count on the alpha counter assembly 82 is counted down to zero (0) [i.e. the count on each of the up-down counters 92, 94, 96 and 98 is zero (0)], the alpha counter assembly 82 produces a carry out signal in the high state on the signal path 106, and the first flip-flop circuit 250 is reset in response to the received carry out signal in the high state on the signal path 106, thereby switching the up-down enable signal on the signal path 108 from the low state to the high state for conditioning the alpha counter assembly 82 in the count-up mode. By the same token, when the count on the beta counter assembly 162 is counted down to zero (0) [i.e. the count on each of the up-down counters 168, 170, 172 and 174], the beta counter assembly 162 produces a carry out signal in the high state on the signal path 182, and the second flip-flop circuit 252 is reset in response to the received carry out signal in the high state on the signal path 182, thereby switching the up-down enable signal on the signal path 184 from the low state to the high state for conditioning the beta counter assembly 162 in the count-up mode. The conditioning of the alpha and the beta counter assemblies 82 and 162 in the count-up and the count-down modes operates so the background radiation counted during the background count period of time (including the contamination radiation since the alpha detector 46 also is in the on condition during both the background count period of time and the radiation count period of time) is subtracted from the count during the radiation count period of time. Thus, the numbers displayed via the alpha display indicator 90 represent the alpha particle activity detected via the alpha detector 46 and counted via the alpha counter assembly 82 during the radiation count period of time [from the time ($t_3$) to the time ($t_4$)] less the alpha particle activity detected via the alpha detector 46 and counted via the alpha counter assembly 82 during the background count period of time [from the time ($t_0$) to the time ($t_1$)]. The numbers displayed via the beta display indicator 166 represent the beta particle activity and the gamma ray radiation detected via the beta detector 40 and counted via the beta counter assembly 162 during the radiation count period of time [from the time ($t_3$) to the time ($t_4$)] less the beta particle activity and the gamma ray radiation detected via the beta detector 40 and counted via the beta counter assembly 162 during the background count period of time [from the time ($t_0$) to the time ($t_1$)]. After the time ($t_4$), the sum of the alpha particle activity displayed via the alpha display indicator 90 and the beta particle activity displayed via the beta display indicator 166 provides the working level (WL) of the air at the test site, and the other parameters contemplated via the present invention are derived from the displayed alpha particle and beta particle activities in a manner described before.

In one operational embodiment of the present invention, a radiation activity indicator constructed utilizing the components described in TABLE VII, below, has been found to provide satisfactory results, the radiation activity indicator being constructed and operated in accordance with the description of the radiation activity indicator 14 (in TABLE VII, Motorola Semiconductor Products, Inc. of Phoenix, Arizona, is designated simply as "Motorola," Precision Monolithics of Santa Clara, California, is designated simply as "Precision," and Hewlett Packard of Palo Alto, California, is designated simply as "HEWLETT").

TABLE VII

| | | Manufacturer | Part Number Designation |
|---|---|---|---|
| 1. | Amplifier 54 or 152 | Motorola | MC 1552G |
| 2. | Pulse height discriminator 56 or 138 | Precision | CMP 01 CJ |
| 3. | Pulse shaper 58 or 140 | Motorola | MC 14528CP |
| 4. | Counter 60 or 142 | Motorola | MC 14017CP |
| 5. | Pulse rate multiplier 62 or 144 | Motorola | MC 14527CP (two utilized) |
| 6. | Counters 92, 94, 96, 98, 168, 170, 172 or 174 | Motorola | MC 14510CP |
| 7. | BCD to 7-segment converters 110, 112, 114, 116, 186, 188, 190 or 192 | Motorola | MC 14511CP |
| 8. | Decimal display indicators 118, 120, 122, 124, 126, 194, 196, 198, 200 or 202 | Hewlett | HP 5082-7740 |
| 9. | Indicator lamps 290, 292 or 294 | Hewlett | HP 5082-4480 |
| 10. | Clock generator 212 | Motorola | |
| 11. | Counter 216 | Motorola | MC 14024CP |
| 12. | Inverter 220 | Motorola | MC 14001CP |
| 13. | Decoder 224 | Motorola | MC 14017CP |
| 14. | NOR gate 238 | Motorola | MC 14002CP |
| 15. | NOR gate 240 | Motorola | MC 14002CP |
| 16. | Inverter 246 | Motorola | MC 14001CP |
| 17. | Flip-flop circuits 250 or 252 | Motorola | MC 14027CP |
| 18. | NOR gates 254 or 256 | Motorola | MC 14001CP |
| 19. | Inverters 270 or 274 | Motorola | MC 14001CP |
| 20. | Transistors 276, 282, 308 or 318 | | 2N3904 |
| 21. | Transistor 298 | | 2N3906 |
| 22. | Resistors 278, 284, 302 or 328 | | 20 kilohms |
| 23. | Resistors 302, 328, 334 or 336 | | 638 ohms |

Figure 4:
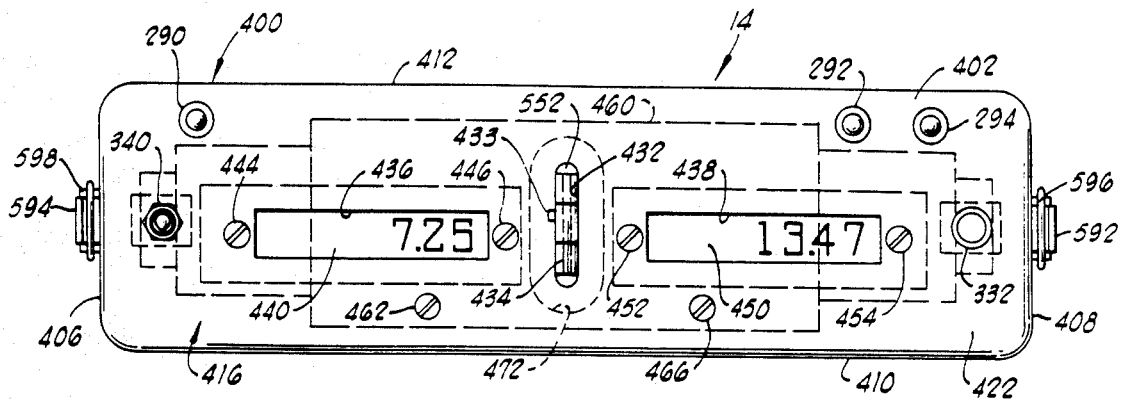
FIG. 4 is a top plan view showing a portion of the radiation activity indicator of FIGS. 1 and 3.
Figure 5:
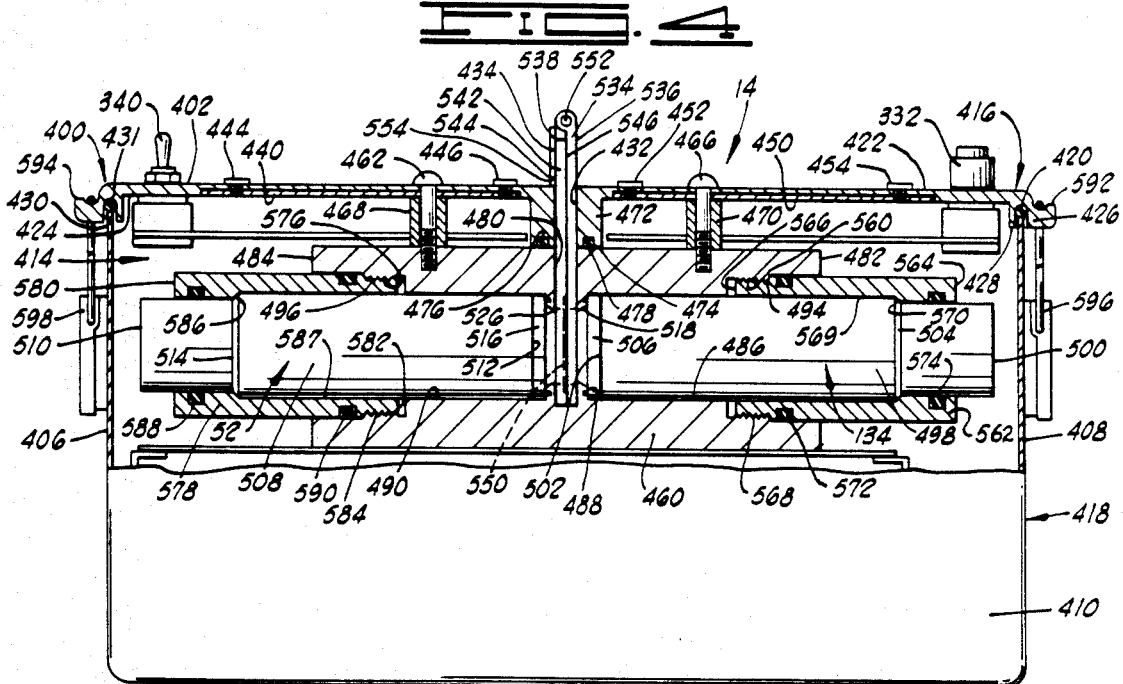
FIG. 5 is a partial sectional, partial side elevational view of the radiation activity indicator of FIG. 4.
Figure 6:
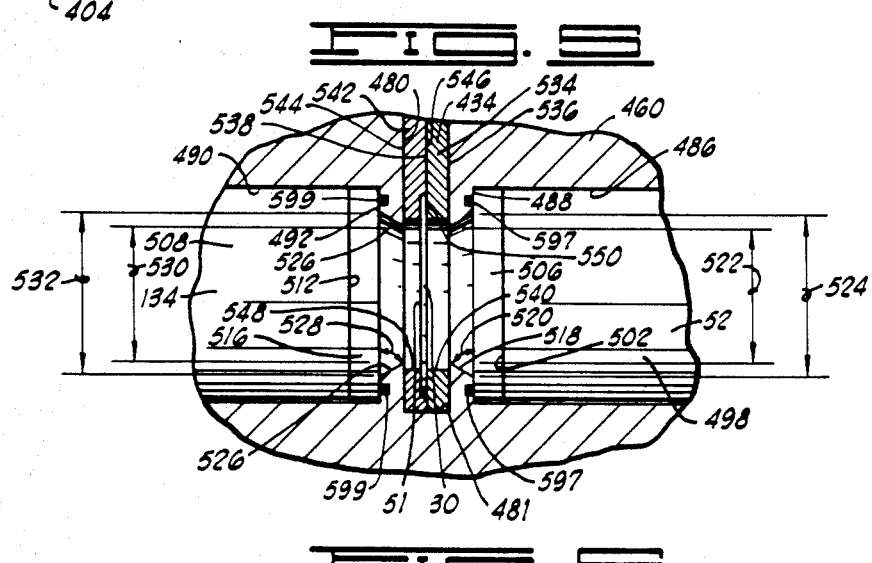
FIG. 6 is an enlarged, partial side elevational, partial sectional view of a portion of the radiation activity indicator of FIG. 5.

Embodiment of FIGS. 4, 5 and 6

As shown in FIGS. 4, 5 and 6, the radiation activity indicator 14 also includes a housing 400 having an upper end 402, a lower end 404, opposite ends 406 and 408, and opposite sides 410 and 412. The housing 400 encloses an open space 414 shaped to accommodate and contain the various components and assemblies of the radiation activity indicator 14 within a relatively small compact space (the open space 414), thereby providing a radiation activity indicator 14 which is portable and can be transported to various remote test sites or locations in a convenient manner, thereby facilitating the convenient utilization of the apparatus of the present invention in practicing the method of the present invention. The housing 400 comprises a cover 416 and a base 418, and the housing 400 can be constructed of such materials as materials including an aluminum or an aluminum alloy, for example.

The base 418 is generally rectangularly shaped having a closed end forming the lower end 404 of the housing 400 and an open end 420. The base 418 encloses a portion of the open space 414, and most of the various components and assemblies of the radiation activity indicator 14 are insertable as a unit through the open end 420 of the base 418 to facilitate the construction, assembly, disassembly, repair and re-assembly of the radiation activity indicator 14.

The cover 416 is generally rectangularly shaped and has an upper surface 422 and a lower surface 424. A flange 426 is formed on the lower surface 424 of the cover 416, generally near the outer periphery of the cover 416, the flange 426 extending a distance from the lower surface 424 and terminating with an outermost end 428. The flange 426 extends peripherally about the cover 416. A recess 430 is formed in the outermost end 428 of the flange 426 and the recess 430 extends peripherally about the entire flange 426. The recess 430 is shaped and disposed to receive a portion of the base 418 generally adjacent and near the open end 420. An annular seal member 431 is partially disposed in the recess 430 and the seal member 431 sealingly engages the cover 416 and an adjacent portion of the base 418, generally near the open end 420.

A sample slot 432 is formed through the cover 416 intersecting the upper and the lower surfaces 422 and 424 and disposed generally in the mid-portion of the cover 416. A key slot 433 is formed in the cover 416 generally adjacent and intersecting the sample slot 432. The sample slot 432 is shaped to slidingly receive a sample holder 434 in a manner to be described in greater detail below.

A pair of spaced window openings 436 and 438 are formed through the cover 416 intersecting the upper and the lower surfaces 422 and 424, the window opening 436 being disposed on one side of the sample slot 432 and the window opening 438 being disposed on the opposite side of the sample slot 432. A transparent display window 440 constructed of a material such as red lucite or the like, for example, is disposed adjacent the lower surface 424 and oriented such that the display window 440 encompasses the window opening 436, the display window 440 being secured in this position via a pair of fasteners 444 and 446. A transparent display window 450 constructed of a material such as red lucite or the like, for example, is disposed adjacent the lower surface 424 and oriented such that the display window 450 encompasses the window opening 438, the display window 450 being secured in this position via a pair of fasteners 452 and 454. The decimal display indicators 118, 120, 122, 124 and 126 of the alpha display indicator 90 are disposed generally adjacent the lower surface 424 of the cover 416 and beneath the display window 440 so the numbers in the decimal system of notation illuminated and displayed via the decimal display indicators 118, 120, 122, 124 and 126 are visually perceivable through the display window 440, the number "7.26" being shown displayed through the display window 440 in FIG. 4, for example [the decimal display indicator 118 also displaying the minus (−) sign during some aspects of the operation of the radiation activity indicator 14 as described before]. The decimal display indicators 194, 196, 198, 200 and 202 of the beta display indicator 166 are disposed generally adjacent the lower surface 424 of the cover 416 and beneath the display window 450 so the numbers in the decimal system of notation illuminated and displayed via the decimal display indicators 194, 196, 198, 200 and 202 are visually perceivable through the display window 450, the number "13.47" being shown displayed through the display window 450 in FIG. 4, for example [the decimal display indicator 194 displaying the minus (−) sign during some aspects of the operation of the radiation activity indicator 14 as described before]. The alpha-beta lamp indicator 290, the sample indicator lamp 292 and the read indicator lamp 294 are supportingly connected to the cover 416 so as to be visually perceivable as shown in FIG. 4. The on-off switch 340 and the reset switch 332 are each supportingly connected to the cover 416 and a portion of each switch 340 and 332 is disposed through the cover 416 so a manually actuatable portion of each of the switches 340 and 342 is accessible for manual actuation during the operation of the radiation activity indicator 14.

A shield 460 is disposed in the open space 414 of the housing 400 and a pair of fasteners 462 and 466 are disposed through openings in the cover 416, a portion of each fastener 462 and 466 being threadedly disposed through a portion of the shield 460. The shield 460 is constructed of a material suitable for shielding radiation such as a cadmium plated mild steel, for example.

A ring-shaped sleeve 468 is disposed about the fastener 462. One end of the sleeve 468 engages the lower surface 424 of the cover 416 and the opposite end of the sleeve 468 engages the shield 460, the sleeve 468 spacing the shield 460 a distance from the cover 416. A ring-shaped sleeve 470 is disposed about the fastener 466. One end of the sleeve 470 engages the lower surface 424 of the cover 416 and the opposite end of the sleeve 470 engages the shield 460, the sleeve 470 spacing the shield 460 a distance from the cover 416. Thus, the fasteners 462 and 466 and the sleeves 468 and 470 cooperate to support the shield 460 in an assembled position connected to and spaced a distance from the cover 416.

A flange 472 is formed on the cover 416 extending a distance from the lower surface 424 and terminating with an outermost end 474. A recess 476 is formed in the outermost end 474 and an elastomeric, O-ring type of seal member 478 is partially disposed in the recess 476. In an assembled position of the shield 460, the outer peripheral surface of the shield 460 engages the outermost end 474 of the flange 472 and the seal member 478 sealingly engages the outer peripheral surface of the shield 460, the seal member 478 forming a seal between the sample slot 432 and the open space 414 in the housing 400.

A sample slot 480 is formed through a portion of the shield 460, the sample slot 480 intersecting the outer peripheral surface of the shield 460 and extending a distance through the shield 460 terminating with a stop surface 481. In the assembled position of the shield 460 connected to the cover 416, the sample slot 480 in the shield 460 is substantially aligned with the sample slot 432 in the cover 416 and the sample slots 432 and 480 are each shaped to slidingly receive the sample holder 434.

The shield 460 has opposite ends 482 and 484, a first opening 486 formed through the end 482 of the shield 460 and extends a distance axially therethrough terminating with an end wall 488. A second opening 490 is formed through the end 484 of the shield and extends a distance axially therethrough terminating with an end wall 492, the first opening 486 being axially aligned with the second opening 490. A bore 494 is formed through the end 482 and extends a distance axially through the shield 460. The bore 494 has a diameter larger than the diameter of the first opening 486, and the bore 494 is axially aligned with and intersects a portion of the first opening 486. A bore 496 is formed through the end 484 and extends a distance axially through the shield 460. The bore 496 has a diameter larger than the diameter of the second opening 490, and the bore 496 is axially aligned with and intersects a portion of the second opening 490. The first opening 486 is sized and shaped to slidingly receive a portion of the radiation detector 134 and the second opening 490 is sized and shaped to slidingly receive a portion of the radiation detector 52.

The radiation detector 134 includes a generally cylindrically shaped tube housing 498 having opposite ends 500 and 502. A portion of the tube housing 498, generally near the end 500 thereof, has a diameter smaller than the diameter of the remaining portion of the tube housing 498, thereby forming a wall 504 extending annularly about the outer peripheral surface of the tube housing 498 and disposed generally between the ends 500 and 502 of the tube housing 498. The tube housing 498 protectively encloses a photomultiplier tube (not shown) and a beta scintillator 506 is secured to the end 502 of the tube housing 498, the scintillator 506 being constructed of a material which emits optical photons in response to radiation or, more particularly, in response to beta particle radiation. The photomultiplier converts the relatively short flashes of light produced as the beta particles pass through the beta scintillator 506 into an electrical signal representing the beta particle activity detected via the radiation detector 134, thereby producing the radiation detector 134 output signal on the signal path 150, as shown in FIG. 3, in a manner described before.

The radiation detector 52 includes a generally cylindrically shaped tube housing 508 having opposite ends 510 and 512. A portion of the tube housing 508, generally near the end 510 thereof, has a diameter smaller than the diameter of the remaining portion of the tube housing 508, thereby forming a wall 514 extending annularly about the outer peripheral surface of the tube housing 508 and disposed generally between the ends 510 and 512 of the tube housing 508. The tube housing 508 protectively encloses a photomultiplier tube (not shown) and an alpha scintillator 516 is secured to the end 512 of the tube housing 508, the alpha scintillator 516 being constructed of a material which emits optical photons in response to radiation or, more particularly, in response to alpha particle radiation. The photomultiplier tube converts the relatively short flashes of light produced as the alpha particles pass through the alpha scintillator 516 into an electrical signal representing the alpha particle activity detected via the radiation detector 52, thereby producing the radiation detector 52 output signal on the signal path 68, as shown in FIG. 3, in a manner described before.

A control opening 518 is formed through the wall 488 in the shield 460, and the control opening 518 extends axially through a portion of the shield 460 intersecting the wall 488 and the sample slot 480. As shown more clearly in FIG. 6, the control opening 518 is formed on an angle 520, thereby providing an opening generally adjacent the sample slot 480 having a diameter 522 and an opening intersecting the wall 488 having a diameter 524, the diameter 522 being smaller than the diameter 524.

A control opening 526 is formed through the wall 492 in the shield 460, and the control opening 526 extends axially through a portion of the shield 460 intersecting the wall 492 and the sample slot 480. As shown more clearly in FIG. 6, the control opening 526 is formed on an angle 528, thereby providing an opening generally adjacent the sample slot 480 having a diameter 530 and an opening intersecting the wall 488 having a diameter 532, the diameter 530 being smaller than the diameter 532.

The sample holder 434 includes a generally rectangularly shaped first plate 534, having a first face 536 and a second face 538. An opening 540 is formed through the first plate 534, the opening 540 intersecting the first and the second faces 436 and 438.

The sample holder 434 also includes a second plate 542, having a first face 544 and a second face 546. An opening 548 is formed through the second plate 542, the opening 548 intersecting the first and the second faces 544 and 546. A recess 550 is formed in the second face 546 of the second plate 542 and the recess 550 is disposed generally adjacent and intersects a portion of the opening 548.

One end of the first plate 534 is hingedly connected to one end of the second plate 542 via a hinge pin 552. In an assembled position of the first and the second plates 534 and 542, the second face 538 of the first plate 534 faces the second face 546 of the second plate 542, and the openings 540 and 548 are substantially aligned.

The first and the second plates 534 and 542 of the sample holder 434 are movable about the hinge pin 552 connection to one position wherein the second faces 538 and 546 of the first and the second plates, respectively, are spaced a distance apart for accommodating the insertion of the sample filter 30 generally between the second faces 538 and 546. More particularly, the sample filter 30 is inserted between the first and the second plates 534 and 542 and disposed generally within the recess 540 formed in the second plate 542, the sample filter 30 being shaped and oriented to extend over the opening 548. After the sample filter 30 has been disposed in the recess 550 of the second plate 542, the first and the second plates 534 and 542 are moved about the hinge pin 552 connection therebetween to a position (sometimes referred to herein as a "closed position") wherein the second face 538 of the first plate 534 is disposed generally adjacent and abuts the second face 546 of the second plate 542, the openings 540 and 548 being substantially aligned in this position of the first and the second plates 534 and 542. In the closed position of the first and the second plates 534 and 542, a portion of the sample filter 30 is disposed generally adjacent the second face 538 of the first plate 534, and the first and the second plates 534 and 542 cooperate to secure the sample filter 30 therebetween in a position wherein a portion of the sample filter 30 extends over the aligned openings 540 and 548.

A key element 554 is formed on the first face 536 of the second plate 542 and the key element 554 extends a distance from the first face 536. The key element 554 extends a distance from the hinged end (the end connected via the hinge pin 552) of the second plate 542 generally toward the opposite end of the second plate 542. The key element 554 is shaped and disposed to be received within the key slot 433 formed in the cover 416 when the sample holder 434 is inserted into the sample slots 432 and 480 to assure that the second plate 542 is disposed near the radiation detector 52 of the alpha detector 46 and the first plate 534 is disposed near the radiation detector 134.

A threaded portion 560 is formed on a portion of the inner peripheral surface formed in the shield 460 via the bore 494 for securing a first insert 562 within a portion of the first opening 486. The first insert 562 is generally cylindrically shaped and has opposite ends 564 and 566. A threaded portion 568 is formed on a portion of the outer peripheral surface of the first insert 562, generally near the end 566 thereof. A portion of the first insert 562 is insertable through a portion of the first opening 486 to a position wherein the threaded portion 568 of the first insert 562 threadedly engages the threaded portion 560 formed in the shield 460, thereby securing the first insert 562 in the first opening 486 of the shield 460.

An opening 569 is formed through the first insert 562 and the opening 569 extends axially through the first insert 562 intersecting the opposite ends 564 and 566 thereof. An annular surface 570 is formed on the inner peripheral surface of the first insert 562 formed via the opening 569. An O-ring seal member 572 is partially disposed in a recess formed in the inner peripheral surface of the first insert 562 formed via the opening 569, and another O-ring seal member 574 is partially disposed in a recess formed in the outer peripheral surface of the first insert 562.

A threaded portion 576 is formed on a portion of the inner peripheral surface formed in the shield 460 via the bore 496 for securing a second insert 578 within a portion of the second opening 490. The second insert 578 is generally cylindrically shaped and has opposite ends 580 and 582. A threaded portion 584 is formed on a portion of the outer peripheral surface of the second insert 578, generally near the end 582 thereof. A portion of the second insert 578 is insertable through a portion of the second opening 490 to a position wherein the threaded portion 584 of the second insert 578 threadedly engages the threaded portion 576 formed in the shield 460, thereby securing the second insert 578 in the second opening 490 of the shield 460.

An opening 587 is formed through the second insert 578, and the opening 587 extends axially through the second insert 578 intersecting the opposite ends 580 and 582 thereof. An annular surface 586 is formed on the inner peripheral surface of the second insert 578 formed via the opening 587. An O-ring seal member 588 is partially disposed in a recess formed in the inner peripheral surface of the second insert 578 formed via the opening 587, and another O-ring seal member 590 is partially disposed in a recess formed in the outer peripheral surface of the second insert 578.

The radiation detector 134 is disposed in the first opening 486 of the shield 460 and moved axially therethrough to a position wherein a portion of the scintillator 506 abuts a portion of the wall 488 thereby limiting the movement of the radiation detector 134 in an axial direction generally toward the sample slot 432. The first insert 562 is disposed on the radiation detector 134, the radiation detector 134 being inserted through the opening 569 to a position wherein the wall 504 formed on the tube housing 498 abuts the surface 570 formed in the first insert 562. The first insert 562 is rotated as the tube housing 498 is inserted in the opening 569 and the threaded portion 568 in the shield 460 threadedly engages the threaded portion formed on the first insert 562 thereby securing the radiation detector 134 in the first opening 486 of the shield 460, the scintillator 506 being disposed adjacent and emcompassing the control opening 518 in the assembled position of the radiation detector 134 in the shield 460. In the assembled position of the radiation detector 134, the seal member 572 sealingly engages the first insert 562 and the adjacent portion of the tube housing 498, and the seal member 574 sealingly engages the first insert 562 and the adjacent portion of the shield 460.

The radiation detector 52 is disposed in the second opening 490 of the shield 460 and moved axially therethrough to a position wherein a portion of the scintillator 516 abuts a portion of the wall 492 thereby limiting the movement of the radiation detector 452 in an axial direction generally toward the sample slot 432. The second insert 578 is disposed on the radiation detector 52, the radiation detector 52 being inserted through the opening 587 to a position wherein the wall 514 formed on the tube housing 508 abuts the surface 586 formed in the second insert 578. The second insert 578 is rotated as the tube housing 508 is inserted in the opening 587 and the threaded portion 560 in the shield 460 threadedly engages the threaded portion formed on the second insert 578 thereby securing the radiation detector 52 in the second opening 490 of the shield 460, the scintillator 516 being disposed adjacent and encompassing the control opening 526 in the assembled position of the radiation detector 52 in the shield 460. In the assembled position of the radiation detector 52, the seal member 588 sealingly engages the second insert 578 and the adjacent portion of the tube housing 508, and the seal member 590 sealingly engages the second insert 578 and the adjacent portion of the shield 460.

A lip 592 is formed on the cover 416, generally adjacent the outer peripheral surface of the cover 416, the lip 592 extending a distance from the cover 416. Another lip 594 is formed on the cover 416, generally adjacent the outer peripheral surface of the cover 416, the lip 594 extending a distance from the cover 416 and being disposed on an end of the cover 416, opposite the end of the cover 416 having the lip 592 formed thereon.

A portion of a first quick release latch 596 is secured to the end 408 of the housing 400 and a portion of the first quick release latch 596 is removably connected to a portion of the lip 592. A portion of a second quick release latch 598 is secured to the end 406 of the housing 400 and a portion of the second quick release latch 598 is removably connected to a portion of the lip 594. The first and the second quick release latches 596 and 598 cooperate to removably secure the cover 416 to the open end 420 of the base 418 in an assembled position of the housing 400.

As shown more clearly in FIG. 6, an annular O-ring seal member 597 is partially disposed in a recess formed in the wall 488 formed in the shield 460, and another annular O-ring seal member 599 is partially disposed in a recess formed in the wall 492. In an assembled position of the radiation detectors 52 and 130 in the shield 460, the seal member 597 sealingly engages the shield 460 and the adjacent portion of the scintillator 506 and the seal member 599 sealingly engages the shield 460 and the adjacent portion of the scintillator 516. The seal members 597 and 599 cooperate with the other seal members 431, 478, 572, 574, 588 and 590 to substantially seal the housing 400 and reduce the possibility of moisture entering the open space 414.

As mentioned before, the sample filter 30 is disposed in the sample collector 12 such that the air passes through a contact face 51 of the sample filter 30, through the sample filter 30 and is discharged out or from the face of the sample filter 30, opposite the contact face 51. In a preferred form, the sample filter 30 is secured in the sample holder 434 and the sample holder 434 is inserted in the sample collector 12 to a position wherein the sample filter 30 is interposed in the inlet conduit 26 in a manner shown in FIG. 1, the sample collector 12 including a key slot similar to the key slot 433 in the cover 416 to assure the proper orientation of the sample filter 30 with the contact surface 51 being positioned for initial contact with the air being pumped through the inlet conduit. After the sample period of time, the sample holder 434 is removed from the sample collector 12 and positioned in the sample slots 432 and 480 in the cover 416 and the shield 460, respectively, the key slot 433 cooperating with the key element 554 to orient the sample filter 30 such that the contact surface 51 of the sample filter 30 is disposed generally adjacent the radiation detector 52 detecting the alpha particle activity, for reasons described before.

As shown more clearly in FIG. 6, the openings 540 and 548 in the first and the second plates 534 and 542, respectively, each have a diameter larger than the diameters 522 and 530 of the control openings 518 and 526, respectively, in the shield 460. When the sample holder 434 is inserted through the aligned sample slots 432 and 480, the end of the sample holder 434, opposite the hinged end thereof, engages the stop surface 481 formed in the shield 460 limiting the movement of the sample holder 434 in the aligned sample slots 432 and 480 in one direction and positioning the sample holder 434 openings 540 and 548 in an aligned position with respect to the control openings 518 and 526 thereby assuring the sample filter 30 is properly positioned with respect to the control openings 518 and 526 for substantially encompassing the control openings 518 and 526.

Embodiment of FIG. 8

Shown in FIG. 8 is a modified radiation activity indicator 14a which is constructed similar to the radiation activity indicator 14, shown in FIG. 3 and described in detail before.

The beta detector 40a is constructed exactly like the beta detector 40 (shown in FIG. 3), except the pulse shaper 140 output signal on the signal path 156 is connected to and received by a background pulse rate multiplier 600 and a pulse rate multiplier 602. The background pulse rate multiplier 600 and the pulse rate multiplier 602 also each receive an enable signal on a signal path 604 provided via a modified sequence control 210a, the enable signal functioning to condition the background pulse rate multiplier 600 and the pulse rate multiplier 602 in the on condition in a manner similar to that described before with respect to the pulse rate multiplier 144 and the enable signal on the signal path 78 (shown in FIG. 3).

A background calibration assembly 605 provides output signals via a plurality of signal paths 606 (only the first and the last signal paths being shown in FIG. 8 and designated therein via the general reference numerals 606A and 606B) and each of the signal paths 606 is connected to and received by the background pulse rate multiplier 600. A calibration assembly 607 provides output signals via a plurality of signal paths 608 (only the first and the last signal paths being shown in FIG. 8 and designated therein via the general reference numerals 608A and 608B) and each of the signal paths 608 is connected to and received by the pulse rate multiplier 602. The background calibration assembly 605 is utilized to adjustingly vary the background pulse rate multiplier 600 output signal provided on a signal path 610, the signal on the signal path 610 being connected to and received by a background digital-to-analog converter 612. The calibration assembly 607 is utilized to adjustingly vary the pulse rate multiplier 602 output signal provided on a signal path 614, the signal on the signal path 614 being connected to and received by a beta digital-to-analog converter 616. The pulse rate multipliers 600 and 602 and the calibration assemblies 604 and 607 can be constructed and operated exactly like the pulse rate multipliers 62 and 144 and the calibration assemblies 64 and 146, shown in FIG. 3 and described in detail before, and, in fact, a counter, such as the counter 142 (shown in FIG. 3), for example, can be included in the beta detector 40a to reduce the amount of the signal conversion to be accomplished via the pulse rate multipliers 600 and 602, if desired in a particular application.

In the embodiment of the invention shown in FIG. 8, the beta detector 40a output indication 44 (shown in FIG. 1) comprises the signals on the signal paths 610 and 614, rather than the single output signal on the signal path 148, as shown in FIG. 3. The background digital-to-analog converter 612 functions to convert the digital type or form of signal received on the signal path 610 to an analog electrical output signal, i.e. an analog signal having a voltage amplitude level indicative of the number of input signal pulses received on the signal path 610, the analog output signal being provided on a signal path 618 and having a voltage amplitude level indicative of the detected background radiation activity. The digital output signal on the signal path 618 is connected to and received by an inverter 620 and the inverter 620 provides an output signal on a signal path having a negative (−) voltage amplitude level corresponding to the received positive (+) voltage amplitude level on a signal path 622, the inverter output signal on the signal path 622 being connected to and received via a first gate control 624. The beta digital-to-analog converter 616 converts the digital type or form of signal received on the signal path 614 to an analog electrical output signal provided on a signal path 626, having a voltage amplitude level indicative of the number of signal pulses received on the signal path 614, the analog signal on the signal path 626 having a positive (+) voltage amplitude level indicative of the detected beta particle activity. The digital output signal on the signal path 626 is connected to and received via the first gate control 624.

The first gate control 624 is an electronic gate type of circuit and includes a summing network for receiving the signals on the signal paths 622 and 626 and providing an output signal indicative of or representing the sum of the received signals on the signal paths 622 and 626 in one condition of the first gate control 624. In one other condition, the first gate control 624 passes the signal received on the signal path 622 and provides an output signal equivalent to the received signal on the signal path 622. In yet another condition, the first gate control 624 passes the signal received on the signal path 626 and provides an output signal equivalent to the signal received on the signal path 626. The various conditions of the first gate control 624, described above, can be controlled via electrical signals provided via the sequence control 210a or the various conditions of the first gate control 624 can be controlled via a manually settable switch position depending on the requirements of a particular application.

In any event, the output signal of the first gate control 624 is provided on a signal path 628 which is connected to and received by an amplifier 630. The amplifier 630 provides an amplified output signal on a signal path 632 which is connected to and received via a second gate control 634. The second gate control 634 also receives a signal on a signal path 636, and is constructed to provide an output signal on a signal path 638 indicative of the sum of the two received signals on the signal paths 632 and 636 in one condition of the second gate control 634. In one other condition, the second gate control 634 also passes only the signal received on the signal path 632 and, in yet another condition, the second gate control 634 passes only the signal received on the signal path 636. Thus, the second gate control 634 is constructed and operates in a manner similar to the first gate control 624, described before.

The second gate control 634 output signal on the signal path 638 is connected to and received via an amplifier 670, and the amplifier 670 provides an amplified output signal on a signal path 672. The amplifier 670 output signal on the signal path 672 is connected to and received by a third gate control 674, and the third gate control 674 also receives a signal on a signal path 676. The third gate control 674 is constructed and operates similar to the gate controls 624 and 634. Thus, the third gate control 624 provides an output signal on a signal path 678 indicative of the sum of the two received signals on the signal paths 672 and 676 in one condition, and the third gate control 674 passes only the signal received on the signal path 672 in one other condition, the third gate control 674 passing only the received signal on the signal path 676 in another condition.

The third gate control 674 output signal on the signal path 678 is connected to and received by an output indicator 680. In the embodiment of the invention shown in FIG. 8, the output indicator 680 is a voltage indicating type of meter wherein the meter needle deflection and associated scale provide the visually perceivable output indications representing the voltage amplitude levels of the signals received on the signal path 680, the deflection of the meter needle in one direction indicating a received signal having a positive (+) voltage amplitude level, and the deflection of the meter needle in the opposite direction indicating a received signal having a negative (−) voltage amplitude level, for example.

The alpha detector 46a is constructed exactly like the alpha detector 46 (shown in FIG. 3), except the pulse shaper 58 output signal on the signal path 74 is connected to and received by a pulse rate multiplier 682. The pulse rate multiplier 682 receives an enable signal on a signal path 684 provided via the sequence control 210a, the enable signal functioning to condition the pulse rate multiplier 682 in the "on" condition in a manner similar to that described before with respect to the pulse rate multiplier 62 and the enable signal on the signal path 78 (shown in FIG. 3).

A calibration assembly 684 provides output signals via a plurality of signal paths 686 (only the first and the last signal paths being shown in FIG. 8 and designated therein via the general reference numerals 686A and 686B) and each of the signal paths 686 is connected to and received by the pulse rate multiplier 682. The calibration assembly 684 is utilized to adjustingly vary the pulse rate multiplier 682 output signal provided on a signal path 688, the signal on the signal path 688 being connected to and received by a digital-to-analog converter 690. The pulse rate multiplier 682 and the calibration assembly 684 can be constructed and operated exactly like the pulse rate multipliers 62 and 144 and the calibration assemblies 64 and 146, shown in FIG. 3 and described in detail before, and, in fact, a counter, such as the counter 60 (shown in FIG. 3), for example, can be included in the alpha detector 46a to reduce the amount of the signal conversion to be accomplished via the pulse rate multiplier 682, if desired in a particular application.

In the embodiment of the invention shown in FIG. 8, the alpha detector 46a output indication 48 (shown in FIG. 1) comprises the signal on the signal path 688. The digital-to-analog converter 690 functions to convert the digital type or form of signal received on the signal path 688 to an analog electrical output signal having a voltage amplitude level indicative of the number of input signal pulses received on the signal path 688, the analog output signal being provided on the signal path 36 and having a voltage amplitude level indicative of the detected alpha particle activity.

The alpha detector 46a is constructed exactly like the alpha detector 46, shown in FIG. 3, except the alpha detector 46a does not include a counter, similar to the counter 60 (shown in FIG. 3). Rather, the pulse shaper 58 output signal on the signal path 74 is connected directly to and received via a pulse rate multiplier 682.

The radiation activity indicator 14a can be operated in a manner exactly like the radiation activity indicator 14, shown in FIG. 3, and in accordance with the timing diagram shown in FIG. 2. The salient difference between the operation of the radiation activity indicator 14a, shown in FIG. 8, and the radiation activity indicator 14, shown in FIG. 3, is the analog type of output indications provided via the radiation activity indicator 14a for use in cooperation with a meter type of output display or the like. Also the radiation activity indicator 14a includes a separate network for providing the background radiation activity indication which can be displayed separately or combined with the beta particle activity indication, as controlled via the first gate control 624.

Changes may be made in the parts or elements described herein or in the steps of the method disclosed herein without departing from the spirit and the scope of the invention as defined in the following claims.

What is claimed is:

1. A method for providing indications of the radiation activity of radon and the decay products of radon, the method comprising the steps of:
   detecting the alpha particle activity occurring as a result of the radiation emissions of the decay products of radon;
   providing an output indication representing the detected alpha particle activity;
   detecting the beta particle activity occurring as a result of the radiation emissions of the decay products of radon;
   providing an output indication representing the detected beta particle activity; and
   summing the output indications representing the detected alpha particle activity and the detected beta particle activity to provide a parameter indicating the radiation activity of the decay products of radon proportional to the working level.

2. The method of claim 1 defined further to include the step of:
   receiving the output indications representing the detected alpha particle activity and the detected beta particle activity and providing an output indication of the sum of the received output indications representing the detected alpha and beta particle activities, the sum of the output indications being a parameter indicating the radiation activity of the decay products of radon proportional to the working level.

3. The method of claim 2 defined further to include the step of:
   receiving the output indications representing the detected alpha particle activity and the detected beta particle activity and providing an output indication of the difference between the received output indications representing the detected alpha particle activity and the detected beta particle activity, the output indication of the difference between the detected alpha particle activity and the detected beta particle activity being a parameter for indicating the radon concentration.

4. A method for providing indications of the radiation activity of radon and the decay products of radon comprising the steps of:
   detecting the alpha particle activity occurring as a result of the radiation emissions of the decay products of radon;
   providing an output indication representing the detected alpha particle activity in terms of counts per minute(cpm);
   calibrating the output indication representing the detected alpha particle activity to provide an output indication proportional to the detected alpha particle activity in terms of disintegrations per minute(dpm);
   detecting the beta particle activity occurring as a result of the radiation emissions of the decay products of radon;
   providing an output indication representing the detected beta particle activity in terms of counts per minute(cpm);
   calibrating the output indications representing the detected beta particle activity to provide an output indication proportional to the detected beta particle activity in terms of disintegrations per minute (dpm); and
   summing the output indications proportional to the detected alpha particle and the detected beta particle activities in terms of disintegrations per minute (dpm) to provide a parameter indicating the radiation activity of the decay products of radon proportional to the working level.

5. The method of claim 4 defined further to include the step of:
   receiving the output indications proportional to the detected alpha particle activity in terms of disintegrations per minute (dpm) and the detected beta particle activity in terms of disintegrations per minute (dpm) and providing an output indication of the sum of the received output indications, the sum of the received output indications being proportional to the working level parameter.

6. The method of claim 4 wherein the step of calibrating the output indication representing the detected alpha particle activity is defined further to include the steps of:
   detecting the alpha particle activity occurring as a result of the radiation emission from a radiation source having a known alpha particle activity occurring as a result of the radiation emission from the radiation source; and calibrating the output indication representing the detected alpha particle activity to provide an output indication proportional to the known alpha particle activity in terms of disintegrations per minute (dpm) prior to the step of detecting the alpha particle activity occurring as a result of the radiation emissions of the decay products of radon; and wherein the step of calibrating the output indication representing the detected beta particle activity is defined further to include the steps of:

detecting the beta particle activity occurring as a result of the radiation emission from a radiation source having a known beta particle activity occurring as a result of the radiation emission from the radiation source; and calibrating the output indication representing the detected beta particle activity to provide an output indication proportional to the known beta particle activity in terms of disintegrations per minute (dpm) prior to the step of detecting the beta particle activity occurring as a result of the radiation emissions of the decay products of radon.

7. A method for providing indications of the radiation activity of radon and the decay products of radon in air at a test site wherein filterable airborne radioactive material from the air at the test site has been deposited on a sample filter, the method comprising the steps of:

detecting the alpha activity from the sample filter occurring as a result of the radiation emissions of the decay products of radon;

providing an output indication representing the detected alpha particle activity;

detecting the beta particle activity from the filter occurring as a result of the radiation emissions of the decay products of radon; and providing an output indication representing the detected beta particle activity; and summing the output indications representing the detected alpha particle activity and the detected beta particle activity to provide a parameter indicating the radiation activity of the decay products of radon proportional to the working level.

8. The method of claim 7 wherein prior to the steps of detecting the alpha particle activity and the beta particle activity, the method is defined further to include the steps of:

detecting the background radiation activity at the test site; and providing an output indication representing the detected background radiation activity, the sum of the detected alpha particle activity and the beta particle activity less the detected background radiation activity being the parameter indicating the radiation activity of the decay products of radon proportional to the working level.

9. A method for providing indications of the radiation activity of radon and the decay products of radon in air at a test site wherein filterable airborne radioactive material from the air at the test site has been deposited on a sample filter, the method comprising the steps of:

detecting the background radiation activity in the air at the test site;

providing an output indication representing the detected background radiation activity;

detecting the alpha particle activity from the sample filter occurring as a result of the radiation emissions of the decay products of radon;

providing an output indication representing the detected alpha particle activity;

detecting the beta particle activity from the filter occurring as a result of the radiation emissions of the decay products of radon;

providing an output indication representing the detected beta particle activity; and summing the output indications representing the detected alpha particle activity and the detected beta particle activity and subtracting the detected background activity for providing a parameter indicating the radiation activity of the decay products of radon in the air at the test site, the parameter being proportional to the working level.

10. The method of claim 9 wherein the step of receiving the output indications is defined further to include the step of:

providing an output indication of the difference between the received output indications representing the detected alpha particle activity and the detected beta particle activity less the detected background radiation activity for utilization with the indicated working level parameter to provide an indication of the radon concentration in the air at the test site.

11. The method of claim 9 wherein the step of detecting the background radiation is defined further to include the step of:

detecting the beta particle activity and the gamma ray radiation activity occurring as a result of the radiation emissions of the decay products of radon in the air at the test site; and wherein the step of providing the output indication of the detected background radiation is defined further to include the step of:

providing an output indication representing the detected beta particle activity and the detected gamma ray radiation activity, the output indication representing the background radiation in the air at the test site.

12. The method of claim 11 wherein the step of detecting the background radiation is defined further to include the step of:

detecting the alpha particle activity at the test site occurring as a result of the radiation emissions of a contamination source of radiation; and wherein the step of providing the output indication of the detected background radiation is defined further to include the step of:

providing an output indication representing the detected alpha particle activity at the test site occurring as a result of the radiation emissions of a contamination source of radiation, and the output indications representing the detected beta particle activity, the detected gamma ray radiation activity and the detected alpha particle activity being the background radiation.

13. A method for providing indications of the radiation activity of radon and the decay products of radon in the air at a test site, the method comprising the steps of:

detecting the background radiation activity in the air at the test site;

providing an output indication representing the detected background radiation activity;

depositing filterable airborne radioactive material from the air at the test site on a sample filter;

detecting the alpha particle activity from the sample filter occurring as a result of the radiation emissions of the decay products of radon;

providing an output indication representing the alpha particle activity detected from the sample filter;

detecting the beta particle activity from the sample filter occurring as a result of the radiation emissions of the decay products of radon;

providing an output indication representing the beta particle activity detected from the sample filter; and summing the output indications representing the detected alpha particle activity and the detected beta particle activity and subtracting the detected background activity for providing a parameter indicating the radiation activity of the decay products of radon in the air at the test site, the parameter being proportional to the working level.

14. The method of claim 13 defined further to include the step of:

receiving the output indications representing the detected alpha particle activity, the detected beta particle activity and the detected background radiation activity, and providing an output indication of the difference between the detected alpha particle activity and the detected beta particle activity less the detected background activity for utilization with the indicated working level parameter to provide an indication of the radon concentration in the air at the test site.

15. The method of claim 13 wherein the step of detecting the background radiation is defined further to include:

detecting the beta particle activity and the gamma ray radiation activity occurring as a result of the radiation emissions of the decay products of radon in the air at the test site; and wherein the step of providing the output indication of the detected background radiation is defined further to include the step of:

providing an output indication representing the detected beta particle activity and the detected gamma ray radiation activity, the output indication representing the background radiation in the air at the test site.

16. The method of claim 15 wherein the step of detecting the background radiation is defined further to include the step of:

detecting the alpha particle activity at the test site occurring as a result of the radiation emissions of a contamination source of radiation; and wherein the step of providing the output indication of the detected background radiation is defined further to include the step of:

providing an output indication representing the detected alpha particle activity at the test site occurring as a result of the radiation emissions of a contamination source of radiation, and the output indications representing the detected beta particle activity, the detected gamma ray radiation activity and the detected alpha particle activity being the background radiation.

17. The method of claim 13 wherein the step of providing the output indication of the background radiation activity is defined further as providing an output indication of the background radiation activity in terms of counts per minute (cpm); and wherein the step of providing the output indication representing the detected alpha particle activity is defined further as providing the output indication of the detected alpha particle activity in terms of counts per minute (cpm); and wherein the step of providing the output indication representing the detected beta particle activity is defined further as providing the output indication of the detected beta particle activity in terms of counts per minute (cpm); and wherein the method is defined further to include:

calibrating the output indication representing the detected background radiation activity to provide an output indication proportional to the detected background radiation activity in terms of disintegrations per minute (dpm);

calibrating the output indication representing the detected alpha particle activity to provide an output indication proportional to the detected alpha particle activity in terms of disintegrations per minute (dpm); and calibrating the output indication representing the detected beta particle activity to provide an output indication of the detected beta particle activity in terms proportional to disintegrations per minute (dpm).

18. The method of claim 17 defined further to include the step of:

receiving the output indications representing the detected alpha particle activity in terms of disintegrations per minute (dpm), the detected beta particle activity in terms of disintegrations per minute (dpm) and the background radiation activity in terms of disintegrations per minute (dpm), and providing an output indication of the sum of the alpha particle activity and the beta particle activity less the background radiation activity to provide an output indication proportional to the working level parameter.

19. The method of claim 18 wherein the step of calibrating the output indication representing the detected alpha particle activity is defined further to include the steps of:

detecting the alpha particle activity occurring as a result of the radiation emission from a radiation source having a known alpha particle activity occurring as a result of the radiation emission from the radiation source; and calibrating the output indication representing the detected alpha particle activity to provide an output indication proportional to the known alpha particle activity in terms of disintegrations per minute (dpm) prior to the step of detecting the alpha particle activity occurring as a result of the radiation emissions of the decay products of radon; and wherein the step of calibrating the output indication representing the detected beta particle activity is defined further to include the steps of:

detecting the beta particle activity occurring as a result of the radiation emission from a radiation source having a known beta particle activity occurring as a result of the radiation emission from the radiation source; and calibrating the output indication representing the detected beta particle activity to provide an output indication proportional to the known beta particle activity in terms of disintegrations per minute (dpm) prior to the step of detecting the beta particle activity occurring as a result of the radiation emissions of the decay products of radon.

20. The method of claim 13 wherein the step of depositing the filterable airborne radioactive material on the sample filter is defined further as being for a predetermined sample period of time; and wherein the steps of detecting the alpha particle activity and detecting the beta particle activity are each defined further as occurring at approximately the same time and for a predetermined radiation count period of time.

21. The method of claim 20 wherein the step of depositing filterable airborne radioactive material is defined further as being for a predetermined sample period of time.

22. The method of claim 20 wherein the step of detecting the background radiation activity is defined further as being for a predetermined background count period of time.

23. The method of claim 22 defined further to include the step of:
transferring the sample filter contaminated with the filterable radioactive material to a location for the detecting of the alpha particle activity and the beta particle activity within a predetermined transfer period of time.

24. The method of claim 23 wherein the step of depositing the filterable airborne radioactive material on the sample filter is defined further to include the step of:
passing air from the test site through the sample filter at a predetermined volumetric flow rate for the predetermined sample period of time.

25. An apparatus for providing output indications of the radiation activity of radon and the decay products of radon, the apparatus comprising:
a beta detector, having an on condition and an off condition, detecting beta particle activity occurring as a result of the radiation emissions of the decay products of radon and providing an output signal representing the detected beta particle activity in the on condition of the beta detector;
an alpha detector, having an on condition and an off condition, detecting alpha particle activity occurring as a result of the radiation emissions of the decay products of radon and providing an output signal representing the detected alpha particle activity in the on condition of the alpha detector; and
an output indicator receiving the beta detector output signal and providing an output indication of the detected beta particle activity in response to the received beta detector output signal, and receiving the alpha detector output signal and providing an output indication of the detected alpha particle activity in response to the received alpha detector output signal, the sum of the output indications of the alpha particle activity and the beta particle activity being a parameter indicating the radiation activity of the decay products of radon proportional to the working level.

26. The apparatus of claim 25 wherein the beta detector is defined further to include:
a radiation detector detecting beta particle activity occurring as a result of the radiation emissions of the decay products of radon and providing an output signal indicating the detected beta particle activity in terms of counts per minute (cpm); and
means receiving the radiation detector output signal and providing an output signal proportional to the detected beta particle activity in terms of disintegrations per minute (dpm).

27. The apparatus of claim 26 wherein the means providing the output signal proportional to the detected beta particle activity in terms of disintegrations per minute (dpm) is defined further to include:
an amplifier receiving the radiation detector output signal and providing an amplified output signal in response thereto;
a pulse height discriminator receiving the amplifier output signal and providing an output signal pulse in response to each received amplifier output signal pulse having a predetermined minimum amplitude; and
means receiving the pulse height discriminator output signal and providing an output signal pulse in a digital form in response to each received pulse height discriminator output signal pulses, having varying amplitudes and provided in response to the detected beta particle activity.

28. The apparatus of claim 27 wherein the means receiving the pulse height discriminator output signal is defined further to include:
means receiving the output signal pulses in a digital form, having a variable output signal, for providing an output signal proportional to the detected beta particle activity in terms of disintegrations per minute (dpm).

29. The apparatus of claim 25 wherein the alpha detector is defined further to include:
radiation detector detecting alpha particle activity occurring as a result of the radiation emissions of the decay products of radon and providing an output signal indicating the detected alpha particle activity in terms of counts per minute (cpm); and
means receiving the radiation detector output signal and providing an output signal proportional to the detected alpha particle activity in terms of disintegrations per minute (dpm).

30. The apparatus of claim 29 wherein the means providing the output signal proportional to the detected alpha particle activity in terms of disintegrations per minute (dpm) is defined further to include:
an amplifier receiving the radiation detector output signal and providing an amplified output signal in response thereto;
a pulse height discriminator receiving the amplifier output signal and providing an output signal pulse in response to each received amplifier output signal pulse having a predetermined minimum amplitude; and
means receiving the pulse height discriminator output signal and providing an output signal pulse in a digital form in response to each received pulse height discriminator output signal pulses, having varying amplitudes and provided in response to the detected alpha particle activity.

31. The apparatus of claim 30 wherein the means receiving the pulse height discriminator output signal is defined further to include:
means receiving the output signal pulses in a digital form, having a variable output signal, for providing an output signal proportional to the detected alpha particle activity in terms of disintegrations per minute (dpm).

32. The apparatus of claim 26 wherein the alpha detector is defined further to include:

a radiation detector for detecting alpha particle activity occurring as a result of the radiation emissions of the decay products of radon and providing an output signal indicating the detected alpha particle activity in terms of counts per minute (cpm); and means receiving the radiation detector output signal and providing an output signal proportional to the detected alpha particle activity in terms of disintegrations per minute (dpm).

33. The apparatus of claim 32 wherein the means receiving the radiation detector output signal and providing the output signal proportional to the detected alpha particle activity is defined further to include:

a pulse rate multiplier providing an output signal pulse in response to an adjustingly controlled number of signal pulses received from the radiation detector providing the output signal indicating the detected alpha particle activity, the pulse rate multiplier having a portion receiving signals and the pulse rate multiplier providing an output signal pulse in response to a predetermined number of received signal pulses adjustingly controlled in response to the received signals; and a calibration assembly providing the output signals received by the pulse rate multiplier for adjustingly controlling the number of signal pulses received by the pulse rate multiplier required to produce an output signal pulse from the pulse rate multiplier for calibrating the alpha detector; and wherein the means receiving the radiation detector output signal and providing the output signal proportional to the detected beta particle activity is defined further to include:

a pulse rate multiplier providing an output signal pulse in response to an adjustingly controlled number of signal pulses received from the radiation detector providing the output signal indicating the detected beta particle activity, the pulse rate multiplier having a portion receiving signals and the pulse rate multiplier providing an output signal pulse in response to a predetermined number of received signal pulses adjustingly controlled in response to the received signals; and a calibration assembly providing the output signals received by the pulse rate multiplier for adjustingly controlling the number of signal pulses received by the pulse rate multiplier required to produce an output signal pulse from the pulse rate multiplier for calibrating the beta detector.

34. The apparatus of claim 32 wherein the output indicator is defined further to include:

a beta counter assembly receiving the beta detector output signal and providing an output signal indicating the number of input signal pulses received from the beta detector, the beta counter assembly comprising:

at least one up-down counter, each up-down counter having a count-up mode, a count-down mode and receiving an up-down enable signal for conditioning the up-down counters in the count-up mode in one state of the received up-down enable signal and for conditioning the up-down counters in the count-down mode in one other state of the received up-down enable signal, the up-down counters receiving and counting the input signal pulses provided via the beta detector output signal and the count on the up-down counters increasing in the count-up mode and decreasing in the count-down mode; and, means generating and providing the up-down enable signal to be received via the up-down counters of the beta counter assembly; and means receiving the beta counter assembly output signal and providing a perceivable output indication of the number of the input signal pulses counted via the beta counter assembly thereby providing a perceivable output indication of the detected beta activity.

35. The apparatus of claim 34 wherein the means providing the up-down enable signal is defined further to include:

a sequence control for automatically controlling the generation of the up-down enable signals, the sequence control providing the up-down enable signal in the one state for conditioning the up-down counters of the beta counter assembly in the count-up mode during a background count period of time and providing the up-down enable signal in the one other state for conditioning the up-down counters of the beta counter assembly in the count-down mode at the beginning of a radiation count period of time; and wherein the up-down counters of the beta counter assembly are defined further as providing a carry-out signal in response to the up-down counters counting down to a zero (0) count; and wherein the sequence control is defined further as receiving the carry-out signal from the beta counter assembly, the sequence control switching the up-down enable signal provided to the beta counter assembly from the one other state conditioning the up-down counters of the beta counter assembly in the count-down mode to the one state conditioning the up-down counters of the beta counter assembly in the count-up mode in response to receiving a carry-out signal from the beta counter assembly indicating a zero (0) count on the beta counter assembly, the count on the beta counter assembly at the end of the radiation count period of time being the count of the input signal pulses received from the beta detector during the radiation count period of time less the count of the input signal pulses received from the beta detector during the background count period of time.

36. The apparatus of claim 35 wherein the output indicator is defined further to include:

an alpha counter assembly receiving the alpha detector output signal and providing an output signal indicating the number of input signal pulses received from the alpha detector, the alpha counter assembly comprising:

at least one up-down counter, each up-down counter having a count-up mode, a count-down mode and receiving an up-down enable signal for conditioning the up-down counters in the count-up mode in one state of the received up-down enable signal and for conditioning the up-down counters in the count-down mode in one other state of the received up-down enable signal, the up-down counters receiving and counting the input signal pulses provided via the alpha detector output signal and the count on the up-down counters increasing in the count-up mode and decreasing in the count-down mode, the up-down counters of the alpha counter assembly providing a carry-out signal in response to the up-down counters counting down to a zero (0) count; and wherein the sequence control is defined further as providing the up-down enable signal in one state for conditioning the up-down counters of the alpha counter assembly in the count-up mode during the background count period of time and providing the up-down enable signal in the one other state for conditioning the up-down counters of the alpha counter assembly in the count-down mode at the beginning of the radiation count period of time, the sequence control receiving the carry-out signal from the alpha counter assembly and switching the up-down enable signal provided to the alpha counter assembly from the one other signal for conditioning the up-down counters of the alpha counter assembly in the count-down mode to the one state for conditioning the up-down counter of the alpha counter assembly in the count-up mode in response to receiving a carry-out signal from the alpha counter assembly indicating a zero (0) count on the alpha counter assembly, the count on the alpha counter assembly at the end of the radiation count period of time being the count of the input signal pulses received from the alpha detector during the radiation count period of time less the count of the input signal pulses received from the alpha detector during the background count period of time; and means receiving the alpha counter assembly output signal and providing a perceivable output indication of the number of input signal pulses counter via the alpha counter assembly thereby providing a perceivable output indication of the detected alpha particle activity.

37. The apparatus of claim 36 wherein the beta detector is defined further as receiving an enable signal and being conditioned in the on condition in response to receiving the enable signal in the low state and being conditioned in the off condition in response to receiving the enable signal in the high state; and wherein the alpha detector is defined further as receiving an enable signal and being conditioned in the on condition in response to receiving the enable signal in the low state and being conditioned in the off condition in response to receiving the enable signal in the high state; and wherein the sequence control is defined further to include:

means generating and providing an output signal having periodic pulses at a predetermined frequency;

means receiving the output signal having periodic pulses and providing the enable signal, the up-down enable signal received by the beta counter assembly, and the up-down enable signal received by the alpha counter assembly, the enable signal being in the low state during the background count period of time and in the low state during the radiation count period of time, the duration of the background count period of time and the duration of the radiation count period of time each being determined in response to the frequency of the received periodic pulses, the up-down enable signal received by the beta counter assembly being switched to the high state at the beginning of the background count period of time and the up-down enable signal received by the beta counter assembly being switched to the low state at the beginning of the radiation count period of time and said means receiving the carry-out signal provided via the beta counter assembly and the up-down enable signal received by the beta counter assembly being switched to the high state in response to receiving the carry-out signal from the beta counter assembly, the output signal provided by the beta counter assembly indicating the number of input signal pulses received from the beta detector during the radiation count period of time less the number of input signal pulses received from the beta detector during the background count period of time, the up-down enable signal received by the alpha counter assembly being switched to the high state at the beginning of the background count period of time and the up-down enable signal received by the alpha counter assembly being switched to the low state at the beginning of the radiation count period of time and said means receiving the carry-out signal provided via the alpha counter assembly and the up-down enable signal received by the alpha counter assembly being switched to the high state in response to receiving the carry-out signal from the alpha counter assembly, the output signal provided by the alpha counter assembly indicating the number of input pulses received from the alpha detector during the radiation count period of time less the number of input signal pulses received from the alpha detector during the background count period of time.

38. The apparatus of claim 37 wherein the means providing the enable signal, the up-down enable signal received by the beta counter assembly and the up-down enable signal received by the alpha counter assembly is defined further to include:

a decoder receiving the output signal having periodic pulses and providing output signals in response to the received periodic pulses;

means receiving at least some of the decoder output signals and providing the enable signal in response to the received decoder output signals, the enable signal being in the low state during the background count period of time;

means receiving at least some of the decoder output signals and providing an output trigger signal in response to the received decoder output signals, the trigger signal being in the high state during the background count period of time;

a first flip-flop circuit receiving the trigger signal and receiving the alpha counter assembly carry-out signal, the first flip-flop circuit providing one output signal in the high state in response to receiving the trigger signal in the high state and the alpha counter carry-out signal in the low state, the first flip-flop circuit output signal being switched to the low state in response to receiving the alpha counter assembly carry-out signal in the high state and the first flip-flop circuit output signal being switched to the low state in response to receiving the trigger signal in the low state;

means receiving the trigger signal and the first flip-flop circuit output signal and providing the up-down enable signal received by the alpha counter assembly in the high state in response to receiving the trigger signal in the high state and providing the up-down enable signal received by the alpha counter assembly in the high state in response to receiving the first flip-flop circuit output signal in the high state;

a second flip-flop circuit receiving the trigger signal and the beta counter assembly carry-out signal, the second flip-flop circuit providing one output signal in the high state in response to receiving the trigger signal in the high state and the beta counter assembly carry-out signal in the low state, the second flip-flop circuit output signal being switched to the low state in response to receiving the beta counter assembly carry-out signal in the high state and the second flip-flop circuit output signal being switched to the low state in response to receiving the trigger signal in the low state; and means receiving the trigger signal and the second flip-flop circuit output signal and providing the up-down enable signal received by the beta counter assembly in the high state in response to receiving the trigger signal in the high state and providing the up-down enable signal received by the beta counter assembly in the high state in response to receiving the second flip-flop circuit output signal in the high state.

39. The apparatus of claim 38 defined further to include:

a reset generator providing a reset signal; and means for connecting the reset signal to the first flip-flop circuit and to the second flip-flop circuit, the state of the output signal of the first flip-flop circuit being switched to the low state in response to receiving the reset signal in the high state and the state of the output signal of the second flip-flop circuit being switched to the low state in response to receiving the reset signal in the high state.

40. The apparatus of claim 25 wherein the output indicator is defined further as providing an output indication wherein the sum of the alpha particle activity and the beta particle activity is proportional to the working level.

* * * * *